(12) United States Patent
Arroyo et al.

(10) Patent No.: US 11,086,860 B2
(45) Date of Patent: Aug. 10, 2021

(54) PREDEFINED SEMANTIC QUERIES

(71) Applicant: Capricorn Holdings Pte. Ltd., Singapore (SG)

(72) Inventors: Sinuhé Arroyo, Madrid (ES); Carlos Ruiz Moreno, Madrid (ES)

(73) Assignee: CAPRICORN HOLDINGS PTE, LTD, Singapore (SG)

(*) Notice: Subject to any disclaimer, the term of this patent is extended or adjusted under 35 U.S.C. 154(b) by 190 days.

(21) Appl. No.: 16/353,368

(22) Filed: Mar. 14, 2019

(65) Prior Publication Data

US 2019/0213185 A1   Jul. 11, 2019

Related U.S. Application Data

(63) Continuation-in-part of application No. 15/698,097, filed on Sep. 7, 2017, now Pat. No. 10,599,643, which is a continuation of application No. 14/284,320, filed on May 21, 2014, now Pat. No. 9,785,671.

(60) Provisional application No. 61/846,547, filed on Jul. 15, 2013.

(51) Int. Cl.
   *G06F 16/245*   (2019.01)

(52) U.S. Cl.
   CPC ................ *G06F 16/245* (2019.01)

(58) Field of Classification Search
   CPC .......... G06F 16/245; G06F 16/2448; G06F 16/2452; G06F 16/254; G06F 16/332; G06F 16/3322; G06F 16/3335; G06F 16/38; G06F 16/9535; G06F 16/972; G06F 17/30424; Y10S 707/99934; Y10S 707/99935; Y10S 707/99943; Y10S 707/99944
   USPC ........................................................ 707/779
   See application file for complete search history.

(56) References Cited

U.S. PATENT DOCUMENTS

2009/0216730 A1* 8/2009 Sastry ................. G06F 16/2428
2015/0339577 A1* 11/2015 Waltinger .............. G06N 20/00
                                                             706/12

* cited by examiner

*Primary Examiner* — Evan Aspinwall
(74) *Attorney, Agent, or Firm* — Quarles & Brady LLP

(57) ABSTRACT

An information retrieval system and method are presented. A template is retrieved from a template repository. The template repository stores a plurality of templates. Each of the plurality of templates includes a concept and a relationship from a knowledge model. The knowledge model defines a plurality of entities and interrelationships between one or more of the plurality of entities. The plurality of entities include concepts and instances. The template is transmitted to a client computer, and a statement is received from the client computer. The statement includes an instantiation of the template. A knowledge base is queried using the statement to generate a result listing identifying an item in the knowledge base. The knowledge base identifies a plurality of items. Each of the plurality of items is associated with at least one annotation identifying at one of the entities in the knowledge model.

20 Claims, 21 Drawing Sheets

File Edit Tools

Advanced Search

Search Options | Triple

Step 1

Select a template ... ▽

Assets with movie that belongs genre
Assets including movie with actor          810
Assets with movie directed by director
Assets where person appears in movie       810
Assets with TV Show belongs to genre
Assets where person produces movie
Assets with TV show created by person      810
Assets with movie that belongs to saga
Assets with character played by actor
Assets including movie with origin county
...

No Template Selected

[Search]

FIG. 8B

File Edit Tools

Advanced Search

Search Options | Triple

Step 2: Edit the concepts

Assets Including | The dark knight rises | with | christian bale | Cancel | Add
830   832   826   824

No Template Selected

Search

FIG. 8D

File Edit Tools

Predefined Semantic Query Search

| PredefinedQuery containsConcept | Input or select a [concept] ▽ | OR ▽ |
| PredefinedQuery containsConcept | Input or select a [concept] ▽ | AND ▽ |
| PredefinedQuery containsRelationship | Input or select a [relationship] ▽ | AND ▽ |
| PredefinedQuery containsRelationship | Input or select a [relationship] ▽ | ▽ |

[ Search ]

Predefined Queries Found: ▽   [ Select ]

FIG. 10

File  Edit  Tools

Semantic Query Search

Concept/Instance:     Relationship:       Concept/Instance

[movie] ▽            contains ▽          FlyingCar ▽

Parameter Constraints:

longerThan 1Hour# ▽   [              ] ▽   [              ] ▽

Search

Results Found: ▽    Select

FIG. 18

```
File  Edit  Tools              ⇦ ⇨  [                                    ]

Semantic Query Search

Unique Identifier:

[ :FlyingCarMovies:  ▽ ]   [ AND ▽ ]   [        ▽ ]

Concept/Instance:         Relationship:           Concept/Instance

[ [movie]        ▽ ]      [ createdIn   ▽ ]       [ [country]   ▽ ]

Add semantic query from predefined semantic query search user interface

[ Add to Catalog ]   [ Search ]

[ Results Found:        ▽ ]   [ Select ]
```

FIG. 21

PREDEFINED SEMANTIC QUERIES

CROSS REFERENCE TO RELATED APPLICATIONS

This application is a continuation-in-part of U.S. patent application Ser. No. 15/698,097, filed Sep. 7, 2017 and entitled "TEMPLATE-DRIVEN STRUCTURED QUERY GENERATION," which is a continuation of U.S. patent application Ser. No. 14/284,320, filed May 21, 2014 and entitled "TEMPLATE-DRIVEN STRUCTURED QUERY GENERATION," which, in turn, claims priority to U.S. Provisional Patent Application No. 61/846,547 filed Jul. 15, 2013 and entitled "TEMPLATE-DRIVEN STRUCTURED QUERY GENERATION."

FIELD OF THE INVENTION

The disclosure relates in general to an electronic system for querying a database and, more particularly, to a method and apparatus for enabling a user to generate a query using a template.

BACKGROUND

Different approaches have been taken with respect to information retrieval and search techniques within large database repositories. Typically, the process of information retrieval is triggered by a query entered by a user. Queries, in this context, formally capture the user's information needs, and are aimed at retrieving a set of results that match the query, ordered by relevancy. In most cases, the user input is a string of natural language text, enabling the execution of keyword queries of a database to retrieve a listing of items from the database that are indexed with the same keywords in the repository.

Two important information retrieval systems performance measures are "precision" and "recall". Given a particular query, a set of items in the repository, and an a priori knowledge of document relevancy so that each item is known to be either relevant or non-relevant for a given query, "precision" measures the ratio between the number of relevant items included in the set of query results and the total number of the set of results, while "recall" measures the ratio between the number of relevant items in the set of results and the total number of relevant items in the repository.

Generally, there is a trade-off between recall and precision, so that if precision is increased, recall will be poor, and in turn, if recall is increased, precision will be poor. For keyword-based systems, many systems do not reach 40% for both measures, given that ambiguous words in the query of a queried database might produce erroneous results and that different ways of referring to the items in the database might cause relevant documents not to appear in the results.

BRIEF SUMMARY

The disclosure relates in general to an electronic system for querying a database and, more particularly, to a method and apparatus for enabling a user to generate a query using a template or a template catalog.

In one implementation, the present invention is an information retrieval system, comprising a knowledge model database configured to store a knowledge model for a knowledge domain. The knowledge model defines a plurality of entities and interrelationships between one or more of the plurality of entities. The plurality of entities include concepts and instances. The information retrieval system includes a knowledge base, also referred to as a knowledge store herein, identifying a plurality of items. Each of the plurality of items is associated with at least one annotation identifying at least one of the entities in the knowledge model. The information retrieval system includes a template repository storing a plurality of templates. Each of the plurality of templates includes a concept and a relationship from the knowledge model. The information retrieval system includes a query processing server configured to retrieve one of the templates from the template repository, transmit the template to a client computer, receive, from the client computer, a statement, the statement including an instantiation of the template, and query the knowledge base using the statement to generate a result listing identifying an item in the knowledge base.

In another implementation, the present invention includes a method, comprising retrieving a template from a template repository. The template repository stores a plurality of templates. Each of the plurality of templates includes a concept and a relationship from a knowledge model. The knowledge model defines a plurality of entities and interrelationships between one or more of the plurality of entities. The plurality of entities include concepts and instances. The method includes transmitting the template to a client computer, and receiving, from the client computer, a statement. The statement includes an instantiation of the template. The method includes querying a knowledge base using the statement to generate a result listing identifying an item in the knowledge base. The knowledge base identifies a plurality of items. Each of the plurality of items is associated with at least one annotation identifying at least one of the entities in the knowledge model.

In another implementation, the present invention includes a non-transitory computer-readable medium containing instructions that, when executed by a processor, cause the processor to perform the steps of retrieving a template from a template repository. The template repository stores a plurality of templates. Each of the plurality of templates includes a concept and a relationship from a knowledge model. The knowledge model defines a plurality of entities and interrelationships between one or more of the plurality of entities. The plurality of entities include concepts and instances. The instructions are configured to cause the processor to perform transmitting the template to a client computer, receiving, from the client computer, a statement, the statement including an instantiation of the template, and querying a knowledge base using the statement to generate a result listing identifying an item in the knowledge base. The knowledge base identifies a plurality of items. Each of the plurality of items is associated with at least one annotation identifying at least one of the entities in the knowledge model.

BRIEF DESCRIPTION OF THE DRAWINGS

FIGS. 8A-8D are screenshots illustrating example user interfaces depicted by the present system FIGS. 9-21 are screenshots illustrating example user interfaces depicted by the present system

DETAILED DESCRIPTION OF THE DRAWINGS

Figure 1:
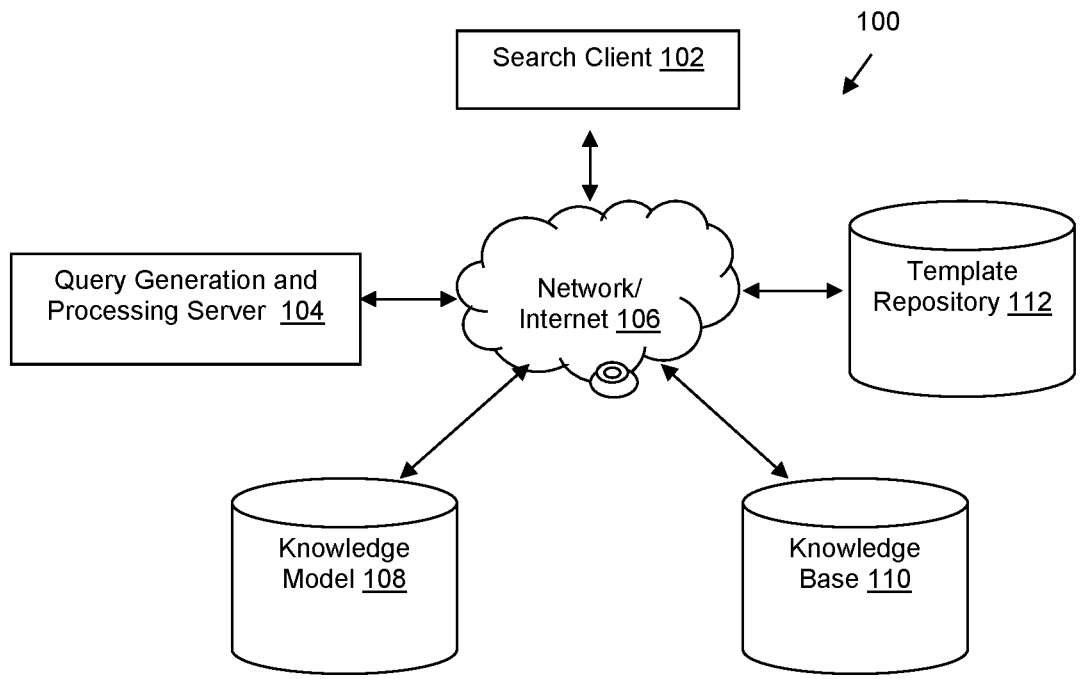
FIG. 1 is a block diagram illustrating one example configuration of the functional components of the present information retrieval system.

The disclosure relates in general to an electronic system for querying a database and, more particularly, to a method and apparatus for enabling a user to generate a query using a template, and/or to store, retrieve and display the generated query, or any other predefined semantic query, to a user, thereby allowing the user to select or modify any of the search parameters within the predefined semantic query.

This invention is described in embodiments in the following description with reference to the Figures, in which like numbers represent the same or similar elements. Reference throughout this specification to "one embodiment," "an embodiment," "one implementation," "an implementation," or similar language means that a particular feature, structure, or characteristic described in connection with the embodiment is included in at least one embodiment of the present invention. Thus, appearances of the phrases "in one implementation," "in an implementation," and similar language throughout this specification may, but do not necessarily, all refer to the same embodiment.

The described features, structures, or characteristics of the invention may be combined in any suitable manner in one or more implementations. In the following description, numerous specific details are recited to provide a thorough understanding of implementations of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Any schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Executing an accurate search for a specific electronic file or document within a collection of files or documents continues to become increasingly complex. As the volume of available electronic files and documents increases, it becomes more and more difficult to precisely identify and access the data most relevant to a user's search. One solution to this problem is referred to in this disclosure as semantic queries. These semantic queries allow users to formulate and to execute queries to search and access data items, such as electronic data, files or documents, based on knowledge of a formalized domain relating to a specific subject.

In this disclosure, assets may refer to any data, file, such as documents, videos, emails, calendar items, music, etc., which may be annotated semantically (e.g., associated with metadata within a database) using elements within ontologies (e.g., concepts, instances of these concepts, and/or relationships between them), which encode domain knowledge. This domain knowledge may be referred to herein as a knowledge model. The assets semantically annotated according to this knowledge model may form, and be referred to herein as, a semantic knowledge store or knowledge base. Assets in a knowledge store are specifically searchable according to semantic queries including the concepts, instances, and/or relationships within the knowledge model that match semantic annotations associated with the assets in the knowledge base. Searching according to this model is referred to herein as a semantic search.

In order to generate a correct semantic query and effectively execute such a semantic search, a user must know and understand not only the query language, but also the knowledge model. However, this disclosure details an alternative method of executing a semantic query search using predefined queries and templates, allowing a user to correctly and consistently generate and execute semantic queries without an understanding of the underlying knowledge model. The user may modify the parameters of these semantic queries, execute them, and save them as predefined semantic queries and/or templates. These predefined semantic queries and/or templates may be stored within a semantic query/template catalog for later modification and/or reuse, and may be searched according to the concept, instance, and/or relationship parameters used.

Thus, this disclosure outlines systems and methods allowing a user to execute such semantic queries of files within the knowledge store database, by inputting, selecting or otherwise defining search parameters used to match the concepts, instances, and/or relationships associated with the files in the knowledge store database with the concepts, instances and/or relationships defining the ontologies in a knowledge model database.

The disclosed systems and methods may include one or more server computers configured to receive input defining one or more ontologies within a knowledge model database. These ontologies may include combinations of concepts, specific instances of the concepts, and/or relationships between the concepts and/or instances. The data records within the knowledge model database may further define a hierarchy of super-groups and sub-groups among and between the concepts, instances, and/or relationships. The relationships between the concepts and/or instances, both within the knowledge model ontologies and the annotations of files in the knowledge store database, may be in a form of <concept/instance> <relationship> <concepts/instance> (e.g., movie contains flyingCar), referred to herein as a triplescore or triple.

The server may query the knowledge model data records or other data within the knowledge model to identify the concepts that make up the ontologies of the knowledge model. The server may further identify specific instances of the identified concepts, and any relationships between the identified concepts and/or instances, and generate a user interface (UI) including one or more UI controls to define a triple, or any combination of triples, according to any combination of concepts, instances, and the relationship(s) between them, as defined in the ontologies of the knowledge model.

The UI controls may identify parameters within the triple(s) that the user may need to replace with a selected value, either by inputting a character string or by selecting a replacement for the parameter from a menu of available value options generated by the server from the knowledge model. The input or selected value may include the highest concept, instance, and/or relationship (i.e., super-group) in a hierarchy as defined in the knowledge model, thereby including all sub-groups of the hierarchy in the search, or allowing the user to replace the parameter with any sub-group of concepts or instances of the identified super-group.

In embodiments where the user selects the value to replace the parameter, the server may execute a database query selecting the relevant concepts, instances, and/or relationships related to the parameters represented in the predefined semantic query template, and populate the UI controls for the parameters accordingly. Responsive to user input for one or more of the parameter UI controls, the query may be re-run to identify concepts, instances and/or relationships within the knowledge model as limited by the selected parameter, and the server may re-populate the remaining parameter UI controls, as limited by the query results.

The UI may include additional UI controls for more complex queries.

These queries may include concatenating triples to other triples (using the Boolean operators and, or, and not), grouping triples with other, possibly concatenated, triples, and/or selecting triples as a parameter within other triples.

Once all parameter input from UI controls has been received from the user operating the client computer, the parameter input may be transmitted to the server(s). The server(s) may analyze the received transmission, and if necessary, identify any missing but required parameter data and generate a notification requesting the missing parameter data (possibly re-generating the UI with previously received parameter data). In some embodiments, the server(s) may identify any missing parameters and automatically replace them with a concept, instance, and/or relationship that either has the same name as the parameter, or is the highest relevant concept (e.g., super-group) related to the parameter.

The server may then generate a search query using the triple(s) identified from the received parameters, and execute it as a database query of the knowledge store. The selected files returned from the data query may include all files in the knowledge store associated with annotations comprising the identified triples or combinations of triples. The server(s) may then generate a list of all returned files from the database knowledge store query result, and transmit the compiled list to the client computer for display and selection by the user, which may then access the assets represented within the list.

The UI may further include UI controls allowing the user, or a system administrator, to input a selection to save the semantic query search as a predefined semantic query. The option to save the parameters for the semantic search query may be presented to the user prior or subsequent to the search. For example, if the search is successful, the user may choose to save the search query parameters as a predefined semantic query. Similarly, the user may continue to modify the search query, parameters, saving each modification as a new predefined semantic search query. Because each search query may be modified according to its parameters, the UI may also include UI controls allowing the user to save each search query, and its parameters, as a semantic search query template.

The server(s) may store each predefined semantic search query and/or semantic search query template as a data record in data storage. The collection of predefined search queries/templates may make up a semantic search query catalog, which may be later selected by the user and/or any other users to execute and/or modify queries searching the knowledge store.

The author of a predefined semantic search query/template may place constraints/restrictions on any of the parameters in the query/template (e.g., searches for movies limited to movies produced in the U.S.). In this disclosure, authors may include a system administrator inputting and defining predefined semantic search queries/templates (possibly by a specialized administrator UI), or any end user inputting and saving a semantic search query as a predefined semantic search query as disclosed herein. The constraint/restriction may restrict any of the parameters that a subsequent user may enter into the UI and/or the parameters of the concepts, instances, and/or relationships searched within the annotations associated with the files in the knowledge store.

The server(s) may analyze the search query catalog and generate and send to the client computer for display, a specialized UI for selecting predefined semantic search queries and/or templates according to one or more concepts, instances, and/or relationships used as parameters in the predefined semantic query/template.

The present system and method provides a mechanism in which users can construct a formal query, and/or one or more predefined semantic queries or templates, composed of statements that comply with an underlying structured knowledge model. In one implementation, the statements define a structured relationship between entities that may be associated with one or more documents in a knowledge base (described below). Such a structured query, including one or more such statement, is able to retrieve a relevant set of results from a document repository (e.g., a knowledge base) in which each document has been annotated with the same kind of statements compliant with a knowledge model (described below).

For a given subject matter, the present system provides both a knowledge model and a knowledge base. A knowledge model is the formal representation of knowledge of any combination of domains described within the knowledge model, including and encoding concepts, specific instances of those concepts, and/or the relationships between them. As a non-limiting example, this disclosure uses triples, in the form of <concept/instance> <relationship> <concept/instance> as a highly expressive ontology representing domain knowledge within the knowledge model. However, an ontology is not the only formal mechanism to encode domain knowledge and the scope of this disclosure should not be limited to ontologies.

The knowledge model includes an ontology that defines concepts, entities, and interrelationships thereof for a given subject matter or knowledge domain. The knowledge model, therefore, normalizes the relevant terminology for a given subject matter domain. The knowledge model may be implemented in a graph structure, in which a set of entities are related through formal relationships. As will be described further below, these formal relationships between entities in the knowledge model are utilized in constructing a number of templates that may be employed by user to facilitate the search process. In the present disclosure, reference is made to ontologies as a mechanism to describe the relationship between a number of entities, however any other equivalent or similar model with a graph structure may be utilized in place of the ontologies of the present disclosure.

The knowledge model may be composed of different ontological components that define the knowledge domain. The components can include concepts, instances, and relationships. Concepts (Classes), which are abstract objects of a given domain (in the present disclosure the knowledge domain of "sports" may be used for a number of non-limiting examples) such as categories or types; an example of a concept would be "basketball player", "team" or "three-point field goal"; Instances (Individual objects) are concrete objects, for example a given player such as "Pau Gasol" or a team like "Los Angeles Lakers"; Relationships (relations) how objects (including both concepts and instances) in the knowledge model relate to other objects, for example the relationship "plays for" links the concept "basketball player" with the concept "team", and also may link the concrete instance "Pau Gasol" with the instance "Los Angeles Lakers". In some cases, two terms may be directly connected through more than one relationship; for example, the concept "basketball player" and the concept "team" may also be related through the "plays against" relationship. The terms of the knowledge model include concepts, instances and relationships of a given domain to be used within a specific application are usually modeled by hand by ontology engineers. Such modeling is a process where arbitrary decisions need to be taken to relate the terms of the knowledge model, and even though there are standard vocabularies and ontologies, the same domain may be modeled in different ways in different knowledge models.

Concepts within the knowledge model may include additional concepts organized in any combination of a super-/sub-concept relationship. These concepts may be organized within a knowledge model database as data records, and a data record identifier for the super-concept may be joined to a data record for a sub-concept, and vice versa. For example, a data record for the concept "movie" within the knowledge model database may be joined with a data record for the concept "prop," establishing a prop as a sub-concept of a movie. The data record for prop may be further joined to the data records for the concepts chair, table, and couch, establishing chair, table, and couch as sub-concepts of both prop and movie, and so on.

The knowledge base (also referred to herein as a knowledge store), in contrast, is the store of information that the information retrieval system is configured to search. The knowledge base is a database including many items (or references to many items) where the items can include many different types of content (e.g., documents, data, multimedia, and the like) that a user may wish to search. The content of the knowledge base can be stored in any suitable database configured to store the contents of the items and enable retrieval of the same.

A user may search for assets within the knowledge base. These assets may include any electronic file items, such as data, data records, documents, videos, music, podcasts, pictures, email conversations, tweets, periodicals, etc., in any format that can be processed (e.g., text in any language), and/or the content of these electronic assets (e.g., the content of a web page). The search may occur within any knowledge store file system container of any scope, such as a file system or repository, a database, the World Wide Web, a mail system, a smart phone, etc. using any interface or means of access.

Some knowledge bases may allow updating assets in place, while others may implement a versioning model in order to keep the update history. Deleting an asset may cause a real removal, and sometimes deleting an asset is a logical deletion. This disclosure includes any and all interfaces and behaviors associated with the knowledge store.

To facilitate searching, the items in the knowledge base can each be associated with different terms (e.g., concepts, instances, and/or relationships) contained within the knowledge base. This association can be made explicitly (e.g., through the use of metadata associated with the content), or implicitly by the item's content. With the items in the knowledge base catalogued using information from the knowledge model, the knowledge model becomes an index or table of contents by which to navigate the contents of the knowledge base.

Thus, assets that make up the knowledge base may be annotated, possibly by attached metadata, or additional data stored in data records associated with the knowledge base, according to the concepts, instances, and/or relationships defined in the ontologies of the knowledge model. Assets annotated in this way are referred to herein as semantically annotated assets, and those assets that are not annotated cannot be searched by the semantic queries described below, unless a general search of all objects in the knowledge base is executed. A single asset may have several annotations. The annotations associated with the assets may also associate the assets with one another. For example, an email may be annotated as a part of an email conversation, or specific documents may be annotated to identify them as part of a periodical.

If updating an asset in a knowledge store results in versioning, then the disclosed system may include an annotation strategy to ensure that a new version has the correct semantic annotations. One possible annotation strategy is to use the same annotations as an immediate preceding version for a new version of an asset. A change of annotation of the new version will, however, not be reflected on its preceding versions.

Any maintenance of ontologies, including changing the name of a concept, for example, will be reflected in the semantic annotations of all versions. While the semantic annotations of the existing versions cannot be changed (except for the last version), ontology changes due to maintenance will be reflected.

If deleting an asset is a logical delete, the semantic annotations of that asset will be part of that deletion and semantic annotations cannot be changed. Ontology maintenance, however, will be reflected as the knowledge store might offer an 'undelete' operation and after invoking this operation the asset is available again for semantic search. Consequently the semantic annotations must be correct.

FIG. 1 is a block diagram illustrating one example configuration of the functional components of the present information retrieval system 100. System 100 includes search client 102. Client 102 includes a computer executing software configured to interact with query generation and processing server 104 via communications network 106. Client 102 can include a conventional desktop computer or portable devices, such as laptops computers, smart phones, tablets, and the like. A user uses client 102 to submit a query and then view the results of that query after execution of the query against a particular knowledge base.

Query generation and processing server 104 is configured to interact with client 102 to perform a query. Query generation and processing server 104 is also referred to herein as one or more server computers 104 or server(s) 104, and may include any computing device known in the art comprising one or more processors, and one or more software instructions executed by the one or more processors within a memory coupled to server computer 104, the software instructions configured to execute any of the process or method steps disclosed herein.

To perform these query generation and processing tasks, query generation and processing server 104 accesses knowledge model database 108, which contains the knowledge model (i.e., the concepts, instances and relationships that define the subject matter domain). Once a query has been created, query generation and processing server 104 executes the query against knowledge base database 110, which stores the knowledge base and any metadata or annotations describing the items of the knowledge base. In knowledge base database 110, the items to be retrieved are generally annotated with one or more of the terms available in the knowledge model.

A knowledge model may be constructed by hand, where engineers (referred to as ontology engineers) lay out the model's concepts, instances and relationships and the relationships thereof. This modeling is a process where domain-specific decisions need to be taken, and even though there exist standard vocabularies and ontologies for different knowledge domains, it is worth noting the same domain may be modeled in different ways and that knowledge models may evolve over time. Sometimes the knowledge model is used as a base and the model's individual components are considered static, but the present system may also be implemented in conjunction with dynamic systems where the knowledge model varies over time.

A knowledge model may define the relationships between a number of terms that may be present in the annotations or metadata associated with different items in the knowledge base. In that case, the knowledge model contains a schema of abstract concepts and their relationships. In the case of a knowledge model for the basketball domain, for example, the knowledge model may define concepts such as "basketball player" and "team" and their connection through the "plays for" relationship. Optionally, the knowledge model may also contain concrete instances with their respective general assertions in the domain, such as concrete basketball player like "Pau Gasol" or teams like "Los Angeles Lakers", and the relationships amongst them.

One possible implementation of the knowledge model, considering the particular example of semantic (ontological) systems could be a "triplestore"—a repository or database that is purpose-built for the storage and retrieval of semantic data in the form of "triples" (or "statements" or "assertions"). Triplestores are well known types of databases and are routinely implemented to managed knowledge models. The concept of "triple" in this sense is to be understood in a broad sense as a data entity that follows a subject-predicate-object (s,p,o) pattern (e.g., subject~predicate~object). Generally, the subject and object of a triplestore can include concepts or instances selected from the relevant knowledge model, while the predicate is a relationship also selected from the relevant knowledge model, although other similar data models may be used. An example triple constructed from two concepts and a valid relationship in the basketball domain would be ("basketball player", "plays for", "team"). As a possibility in this respect, a semantic data model widely extended for expressing these statements is the Resource Description Framework (RDF). Query languages like SPARQL are one possibility for retrieving and manipulating RDF data stored in triplestores, although other mechanisms are also possible.

The knowledge model thus contains the relationships amongst the different types of resources in the application domain. The knowledge model contains both the (ontological) schema of abstract concepts and their relations (see, for example, the knowledge model graph shown in FIG. 3) such as ("basketball player", "plays for", "team"), as well as instances with their respective general "static" assertions valid for the whole domain, such as concrete "basketball players" like "Pau Gasol" or "Kobe Bryant", and their relationship to the teams they play for, etc.

As explained above, the ontology-engineering task by which the model is configured can be a manual process, though it might utilize semiautomatic support by previously identifying the kind of concepts and instances that will be relevant for the domain.

As an example, in the particular scenario of triple-based statements, the abstract concept-relationship-concept (C,r,C) statement like ("basketball player", "plays for", "team") could be stored in the knowledge model as a triple statement, along with specific instances in the domain such as "Pau Gasol" (and the instance's association to the "basketball player" concept) or "Los Angeles Lakers" (which belongs to the "team" concept), and their respective relationships for the whole domain.

In other implementations of the knowledge model, other types of repositories, instead of triple-store-based knowledge models, are also able to contain and define the entities and relationships of the knowledge model.

The knowledge base is the repository that contains the items or content that the user wishes to search and retrieve. The knowledge base may store many items including many different types of digital data. The knowledge base, for example, may store plain text documents, marked up text, multimedia, such as video, images and audio, programs or executable files, raw data files, etc. The items can be annotated with both particular instances (e.g., "Pau Gasol") and concrete assertions ("Pau Gasol", "plays for", "Spanish national team") selected from the knowledge model, which are particularly relevant for the given item. One possible implementation of the knowledge base is a Document Management System that permits the retrieval of documents via an index of the entities of the knowledge base. To that end, documents in the repository need to be associated to (or "annotated with") those entities.

For each annotation in the knowledge base, both concepts (e.g., "basketball player") and particular instances (e. g., "Pau Gasol") from the knowledge model may have been used to build the annotation statement. If the underlying knowledge model is a semantic model, the statements can take form as triple-based (s,p,o) assertions.

In the case that the knowledge model is a semantic model and is constructed using triple statements, there may be four possible combinations for the triple-based statements that can be used to annotate the items in the knowledge base: (C,r,C), (C,r,I), (I,r,C) and (I,r,I), where 'C' stands for "Concept", 'I' stands for "Instance" and 'r' stands for "relationship". As such, a particular item in the knowledge base may be annotated with, respectively, abstract statements that include concepts and no instances (e.g., ("basketball player", "plays for", "team")), more precise statements where one of the concepts is replaced with an instance (e.g., ("basketball player", "plays for", "Los Angeles Lakers") or ("Pau Gasol", "plays for", "team")), or statements that include no concepts and only instances and relationships (e.g., ("Pau Gasol", "plays for", "Los Angeles Lakers")). Again, in other implementations, these types of statements may be modified if the underlying knowledge model is not based on triples.

With respect to the association of triple statements to documents in the knowledge base (i.e., annotation), different approaches can be utilized. In particular, the process of annotation can be performed both manually, with users associating particular statements to the knowledge base item, and automatically, by detecting which references to concept, entities, and/or relationships appear in each item in the knowledge base, and matching them to triple-based statements from the knowledge model. The documents in the knowledge base are then indexed according to the structured statements that appear in or have been associated to them.

The techniques described herein can be applied to repositories of documents in which annotations have been performed through different manners. The process of annotation for the documents may have been performed both manually, with users associating particular concepts and instances in the documents to particular entities in the knowledge model, and/or automatically, by detecting which references to entities appear in each knowledge base item. Systems may provide support for manual annotations by facilitating the user finding and selecting entities from the knowledge model, so these can be associated to items in the knowledge base. For example, in a possible embodiment, the system may offer auto-complete functionality so when the user begins writing a portion of a word, the system might suggest a potential completion for the word. The user may decide then to annotate a given item with the chosen instance, i.e., to specify that the entity from the knowledge model is associated to the particular item in the knowledge base.

When automatically creating metadata for the knowledge base items, techniques like text parsing and speech-to-text over the audio track or a multimedia item can be used along with image processing for videos. In this manner, it is possible to associate each of the items in the knowledge base (or even portions of the items), with the entities (e.g., concepts, instances, and relationships) that are present in the relevant knowledge model. This process is dependent on the knowledge model because the identification of entities in the knowledge base item is performed in reliance upon the knowledge model. For example, the visual output of certain documents (e.g., images or video) can be analyzed using optical character recognition techniques to identify words or phrases that appear to be particularly relevant to the document. These words or phrases may be those that appear often or certain words or phrases that may appear in a corresponding knowledge base. For example, when operating in the sports knowledge domain, when a document includes words or phrases that match particular concepts, instances, relationships, or entities within the knowledge domain (e.g., the document includes the words "football", "Pele", and "World Cup") the document can be annotated using those terms as they relate to either concepts, instances, or relationships in the knowledge model. For documents containing audio, the audio output can be analyzed using speech to text recognition techniques to identify words or phrases that appear to be particularly relevant to the document. These words or phrases may be those that are articulated often or certain words or phrases that may appear in a corresponding knowledge base. For example, when operating in the sports knowledge domain, when a document includes people discussing particular concepts, instances, or relationships within the knowledge domain, the document can be annotated using those terms.

Additionally, a combination of approaches (semiautomatic techniques) is also possible for annotating the knowledge base. The result of such annotation techniques is that the items in the knowledge base repository are then indexed with metadata according to the entities (knowledge model concepts, instances and/or relationships) that appear in or have been associated to the items.

In the case of manual annotation, terms that belong to the knowledge model are associated with the items in the knowledge base. Different techniques for encouraging users to participate in the manual annotation of content may be applied, like the use of Games with a Purpose to leverage the user's interactions while they play. Again, the underlying knowledge model and the model's design define the kinds of annotations that can be applied to the items in the knowledge base.

The searches of the knowledge base 110 in this disclosure are primarily formulated and executed as semantic searches, in which server 104 identifies annotations within the assets in the knowledge base 110 that match one or more triples used within the search query. However, this should not limit the scope of this disclosure. Searches may also take place on a syntactic level, meaning that server 104 matches a string in the search query to a string in the title or content of the electronic files in the knowledge base 110.

In this disclosure, a valid semantic query includes a valid combination of concepts, instances of those concepts, and/or relationships consistent with the ontologies within the knowledge model database 108. If the concepts, instances, and/or relationships in a semantic query are not consistent with the concepts, instances, and/or relationships in the ontologies within the knowledge model 108, any result set produced from the semantic query will be empty.

As noted above, it may be difficult for a user to formulate and execute an effective query, because the user may not have a detailed knowledge of the ontology structure within the knowledge model 108, and therefore may not know how to structure a semantic query to search assets within the knowledge base 110. To address this problem, server 104 in the disclosed system may be configured to simplify the data input required from the user to create and execute such a semantic query. This simplification may be made according to the fixed triple pattern above, namely <concept/instance> <relationship> <concept/instance>. Server 104 may therefore construct a semantic query representing the concepts, instances, and/or relationships from the ontologies within a knowledge model 108. For example, if server 104 were to analyze the semantic query <concept1> <relationship> <concept2>, server 104 would identify, within the knowledge model 108, all possible concepts as well as all possible relationships between concept 1 and concept 2. While this is the most generic predefined semantic query template, it is fully supported and valid.

In another example, server 104 may generate a query, based on the ontologies within the knowledge model 108, of "movie <relationship> English," which has one parameter representing a semantic query including a relationship between "movie" and "English." Using the parameters of this semantic query, server 104 may select all data records in the knowledge model 108 associated with all possible relationships that exist between "movie" and "English". Server 104 may then generate a list of the identified relationships that would be valid to replace the parameter <relationship>. Server 104 may then generate a UI (possibly the predefined semantic query template described below) that includes one or more UI controls. These UI controls may be populated with a menu listing the relationships from the selected data records, each selection option naming a relationship from each data record.

Similarly, if server 104 were to analyze the semantic query "movie shorterthan <duration-in-hours>", server 104 may identify concepts and/or instances of concepts from data records within the knowledge model 108 that are valid values to act as replacements for the parameter "duration-in-hours." For example, server 104 may select all data records including instances (or concepts themselves) associated within the knowledge model 108 with the concept duration-in-hours, and identify, within the returned records, "1 h," "2 h," "3 h," or "duration-in-hours" as valid values to replace the parameter <duration-in-hours>.

In this disclosure, contextualization or instantiation may be defined as replacing a parameter with a value and/or replacing a concept with an instance of that concept, as defined by the ontology in the knowledge model 108. The user may therefore input or select "1 h," "2 h," "3 h," or "duration-in-hours" as values to contextualize or instantiate the concept. The parameter <duration-in-hours> could be replaced with the concept "duration-in-hours" itself. In this case the query would return all movies that are shorter than any of the instances or sub-concepts, effectively returning all movies shorter than 3 h. Relationships may also be parameterized. For example, in the example above, "movie <relationship> English," users may define the particular relationship that should be queried. Other relationships for this triple may include "production-language," "translation-language," "subtitle-language," and so on.

Figure 13:
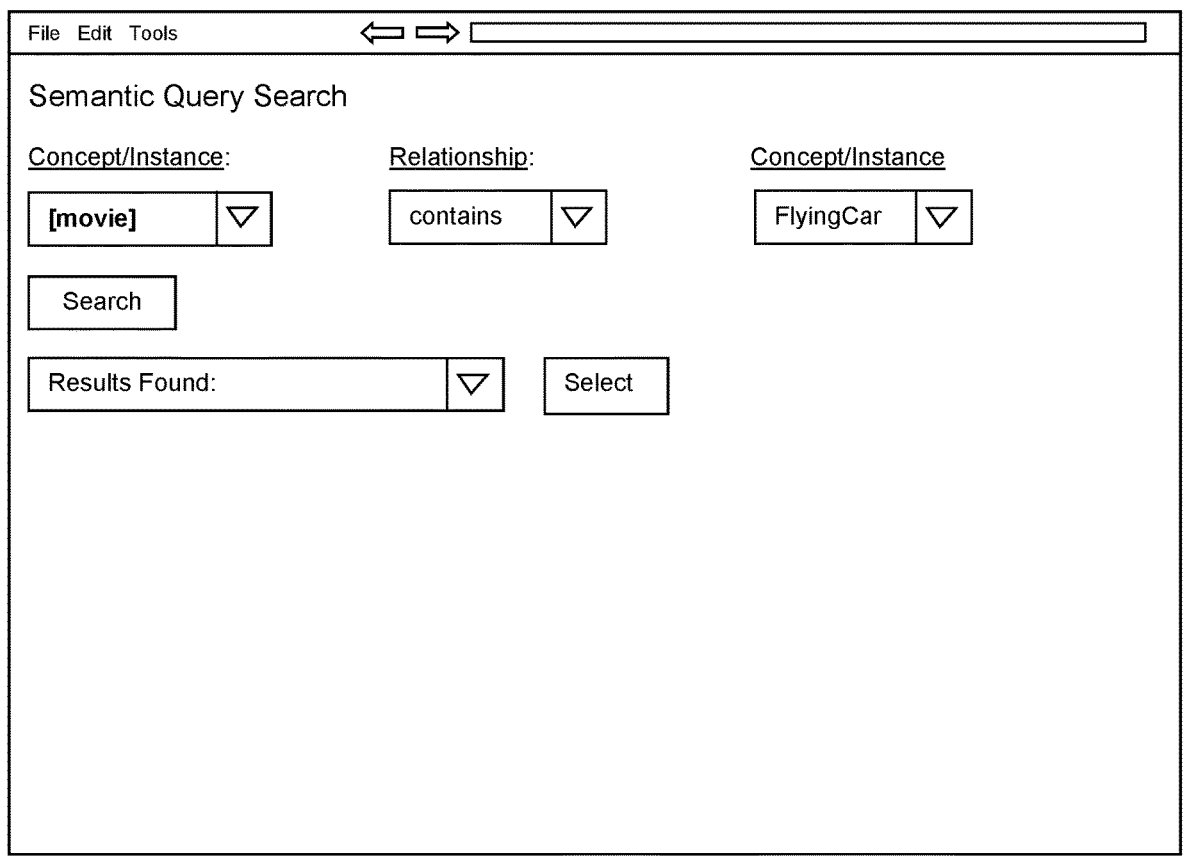
Figure 14:
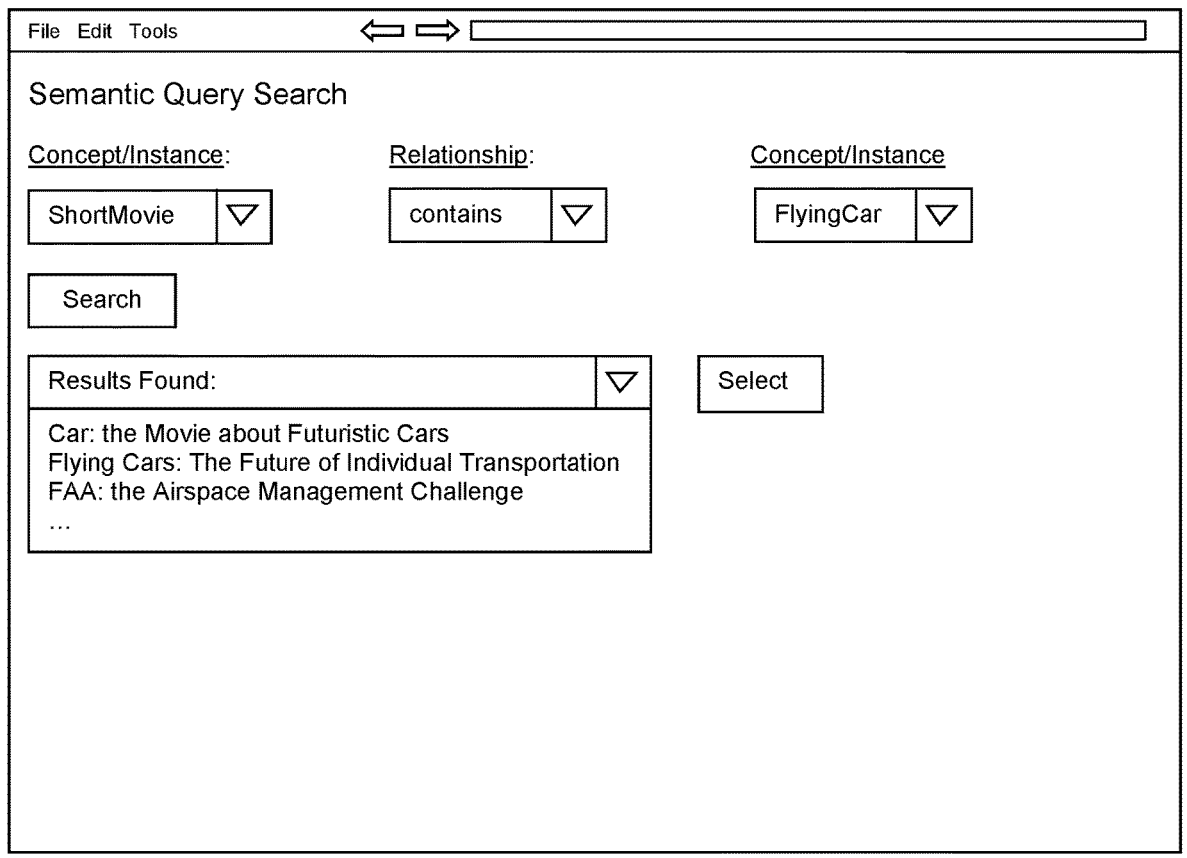

FIGS. 13-14 are screenshots illustrating a UI enabling a user to initiate and perform a simple semantic query in accordance with the present disclosure. In some disclosed embodiments, server 104 hosts a web server configured to generate and transmit to client 102 the UIs depicted in the disclosed screenshots in the figures. In these embodiments, the UIs may be depicted or implemented as web pages, though any other technologies for generating UIs for client 102 may be utilized.

All UIs disclosed herein, as demonstrated by the figures, may be self-contained, meaning that no specialized workspace is required to display correct concepts, relationships or instances. The disclosed UIs are therefore portable and capable of being embedded into any known display format (e.g. existing web pages or desktop user interfaces). All UIs may further be customized to a user's level of expertise with the knowledge model 108. The UIs may therefore be presented to a user using any graphical representation, or in a text and/or terminal-based format at any level of detail (e.g., including parameter constraints, as discussed below).

In order to generate the UIs, server 104 may generate and execute a database query of the knowledge model 108, and analyze the resulting data records to identify all concepts, instances, and/or relationships to be used in triples making up the ontologies within the knowledge model 108. Using these ontologies, server 104 may render the UI by generating UI controls, such as the example combo boxes in the figures, for receiving input from users replacing the parameters, according to the <concept/instance> <relationship> <concept/instance> pattern.

Server(s) 104 may transmit the UI to client 102 for display. The user may replace the parameters via character input and/or selection and submit the search, possibly by clicking on a generated "Search" button. The user input to replace the parameter with the selected concept, instance, and/or relationship may include any combination of a character string input by the user, or a selection by the user from a generated list. As noted above, the list may be populated by server 104 using the concepts, instances, and/or relationships identified from analysis of the data records resulting from the query of the concept model database 108.

In FIG. 13, the user has replaced the first concept/instance parameter with the concept [movie], indicating that all assets in the knowledge base 110 that are annotated with instances and subgroups of this concept should be included in the search results. Similarly, the user has replaced the relationship parameter with the relationship "contains," and has replaced the second concept/instance parameter with the instance "FlyingCar."

The user may then submit the semantic query (including the triple created from the replaced parameters) to server 104. Server 104 may execute a database query of the knowledge base 110, identifying each of the assets annotated with the triple <movie> <contains> <FlyingCar> (or, in the case of FIG. 14, <ShortMovie> <contains> <FlyingCar>, including a subset/instance of [movie]) within the knowledge base 110. Server 104 may then generate a list of available assets within the knowledge base 110 matching the submitted triple(s), possibly as a dropdown as seen in FIG. 14, and transmit the containing UI to client 102 for display. The user may then select the desired asset(s) from the list to access them from the knowledge base 110.

In one implementation, the query is constructed by the server(s) using a template, where the template describes a candidate relationship between search terms, where the candidate relationship is one found in the relevant knowledge model and the search terms, in one implementation, may be concepts selected from the same knowledge model. Query processing server 104 provides the candidate template to the client 102 and receives, in response, a query having a structure that is compliant with the candidate template. Query processing server 104 then uses the template-based query to query a knowledge base to generate a listing of items in the knowledge base that satisfy the template-based query.

Each of the assets within the knowledge base 110 may be associated with any number of annotations, including any number of triples. Users may desire to refine their semantic search to better identify one or more specific assets within the knowledge store by increasing the number of triples used to match with the annotations associated with the assets in the knowledge store. To accommodate this desire, server 104 may be configured to generate a UI including one or more UI controls for receiving additional parameters for additional triples used to execute the semantic search of the knowledge store.

For example, the UI control(s) may include a button or link that, when selected by the user, causes server 104 to generate an additional set of UI controls, for display on client 102, configured to receive the parameters for one or more additional triples from the user. Each additional set of UI controls may further include UI controls configured to receive input from the user identifying a Boolean or grouping operator defining the relationship between and among the one or more triple parameters input by the user.

For example, a user may desire to find a movie in the knowledge store that is shorter than a specific length of time, and that is produced in a specific production language. The user may therefore input triples containing the parameters <movie> <shorter-than > <duration-in-hours>. The user may then select a UI control, such as a button, link, dropdown menu, etc., indicating that the user wants to add, and or group additional triples to the original triple. In response, server 104 and/or client 102 may generate additional UI controls for the user to input additional parameters for additional triples, such as <movie> <production-language> <language>. The additional UI controls may also be configured to receive input from the user indicating a Boolean value to connect the triples (e.g., and, or, not), as well as grouping operators, such as parentheses, to group one or more of the triples, indicating the order in which the triples should be used to identify the annotations for the assets in the knowledge base 110. The final semantic search, in this example, would therefore include <movie><shorter-than><duration-in-hours><AND><movie><production-language><language>.

Figure 15:
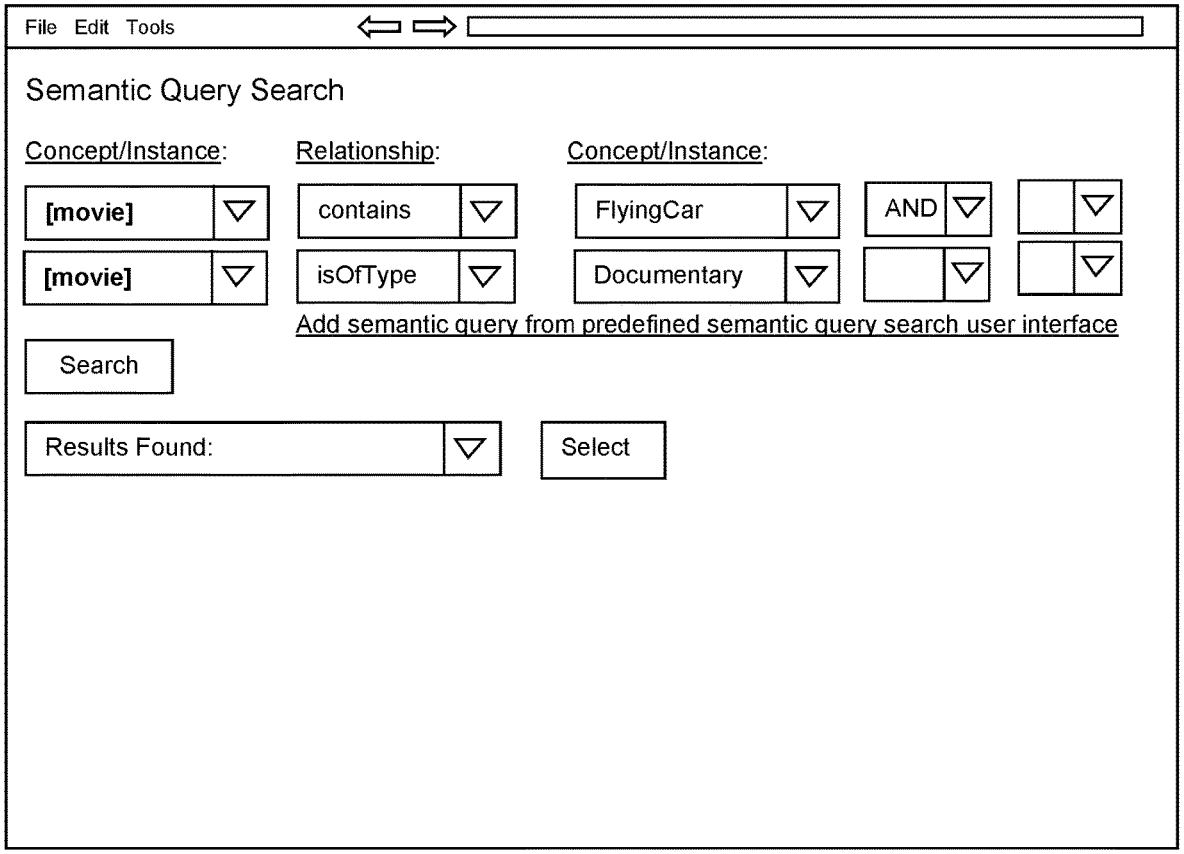
Figure 16:
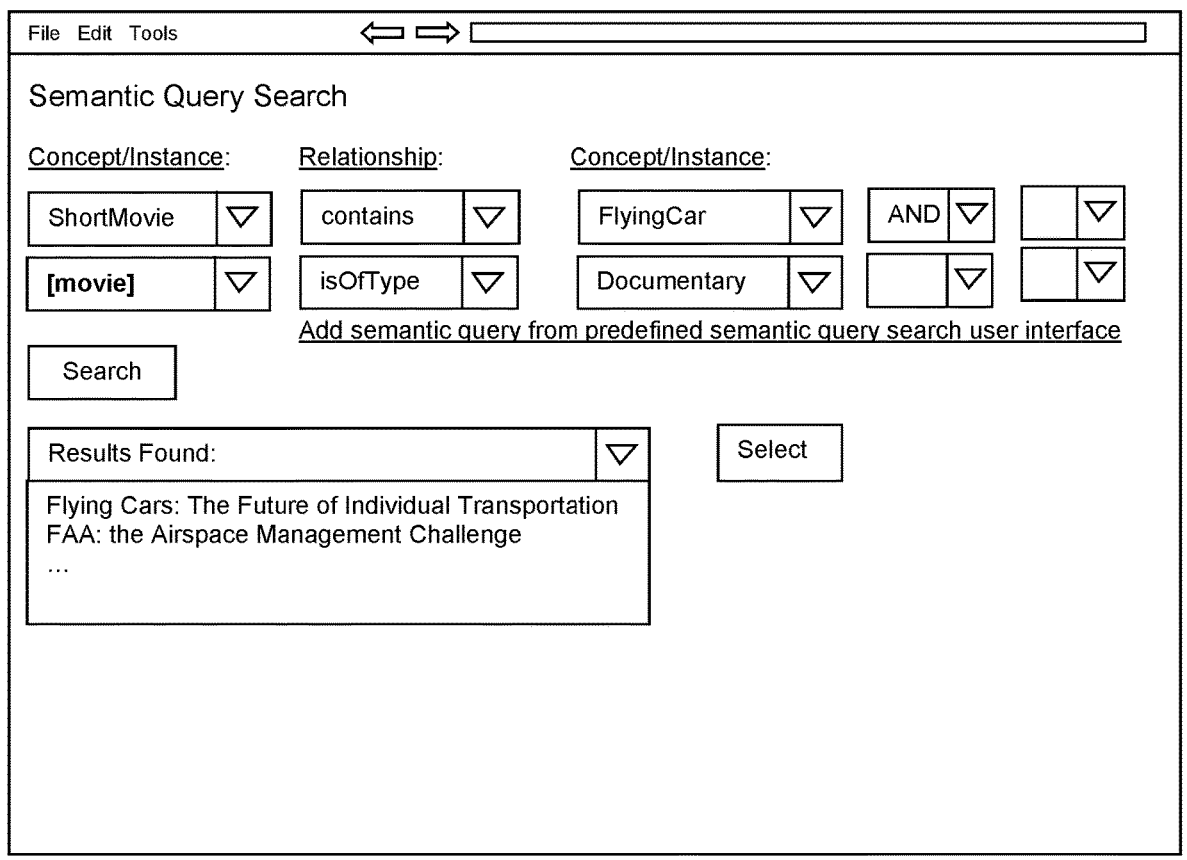

FIGS. 15-16 are screenshots illustrating a UI enabling a user to initiate and perform a complex semantic query in accordance with the present disclosure. Server 104 may generate a UI according to the method steps disclosed above. In addition to the parameter UI controls, the UI may include, as seen in FIGS. 15-16, menus for selecting Boolean operators and/or parentheses/brackets for grouping multiple triples.

Server 104 may transmit the UI to client 102 for display. In addition to replacing parameters as disclosed above, the user may select from a menu of Boolean operators (e.g., and, or, not, using the dropdown menu in FIGS. 15-16). In response to the selection of the Boolean operator, server 104 and/or client 102 may generate an additional set of parameters for the user to select in order to create an additional triple (which may also have UI controls for Boolean operators or grouping brackets). The user may select the Boolean and/or grouping operators for the user's generated triples (e.g., <[movie]/ShortMovie> <contains> <FlyingCar> <AND> <[movie]> <isOfType> <Documentary> in FIGS. 15-16), and submit the query.

Server(s) 104 may execute a database query of the knowledge base 110 as disclosed above. However, the database query of the knowledge base 110 will only include those movies that are short movies, contain flying cars, and are of type documentary, according to the complex query generated by the user, as seen in FIGS. 15-16.

Individual parameters within the predefined semantic query (or any semantic query) may be replaced by a fully contextualized semantic query template, which may be bound to the original predefined semantic query. For example, the triple<genre> <of> <movie> will return all genres of all movies (since movie is not further contextualized). However, the query <genre><of>(<movie> <production-location> <US>) would first determine all movies produced in the US, then use the movies returned from that query as contextualization for determining the genre.

Figure 17:
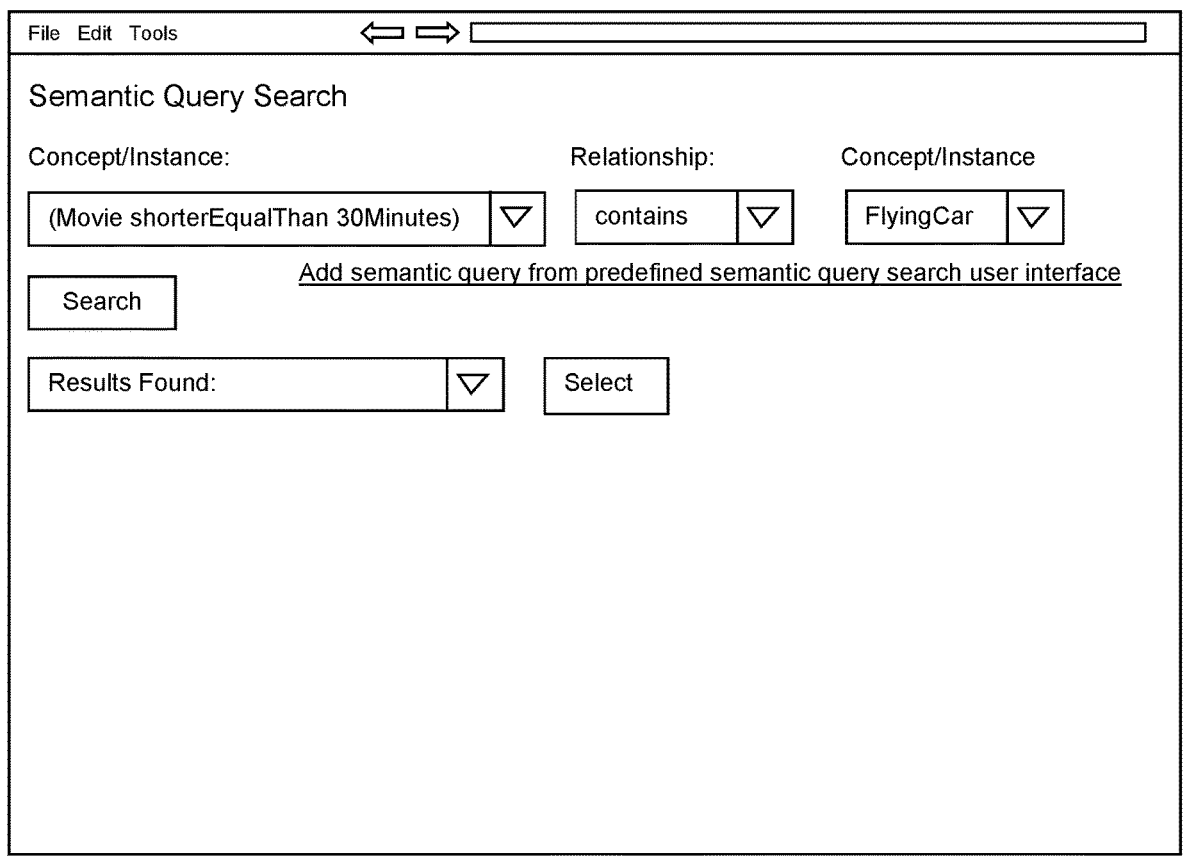

FIG. 17 is a screenshot illustrating a UI enabling a user to initiate and perform an embedded semantic query in accordance with the present disclosure. Server 104 may generate a UI according to the method steps disclosed above. In addition to the parameter UI controls, the UI may include, as seen in FIG. 17, a link or menu for embedding a semantic query as a replacement for one of the parameters in the semantic query.

Server 104 may transmit the UI to client 102 for display. The user may select an additional semantic query triple as a replacement to one of the parameters. For example, in FIG. 17, the user has replaced the first concept/instance parameter with the triple (Movie shorterEqualThan 30 Minutes).

After the user submits this query, server 104 may execute a database query of the knowledge base 110 as disclosed above. However, the database query of the knowledge base 110 will first identify all movies shorter than or equal to 30 minutes in length, then from that group, identify all of those movies containing a flying car as seen in FIG. 17.

The disclosed systems and methods may include a template generated from a predefined semantic query. Predefined semantic queries, as used in this disclosure, may include semantic queries that can be reused by users. The generated predefined semantic query template may include defined or undefined parameters within the predefined semantic query that may be replaced with other valid values as determined by the ontologies in the knowledge model. For example, in the triple <movie> <shorter-than> <duration-in-hours>, the symbols "<" and ">" may indicate a parameter used in the predefined semantic query that may be replaced by other valid triple values in the knowledge model 108. Once a semantic query has been created, server 104 may store the template for the predefined semantic query within a template repository 112 as a template which may be reused. Template repository 112 is a database storing a number of templates for potential queries of knowledge base 110.

Reuse of a predefined semantic query template may include simply re-executing the query, or modifying or updating the query as needed by the user. In this disclosure, contextualization refers to this process of adjusting an existing query to a user's specific needs. For example, an original semantic query may have been for a document referencing the Hubble Space Telescope, but the user may update the original query to replace a document search for the Hubble Telescope with a search for a video. Similarly, a user may replace the value 2 h in the predefined semantic query <movie> <shorterthan> <2 h> with 1.5 h, so that the updated query is contextualized to become <movie> <shorterthan> <1.5 h> prior to execution of the query.

When a user wishes to query knowledge base 110, query generation and processing server 104 may access template repository 112 to retrieve a number of candidate templates therefrom, where the candidate templates describe candidate structures for queries of knowledge base 110. Those candidate templates can then be provided to client 102 for selection. Once a candidate template has been selected and completed by client 102, query generation and processing server 104 receives the completed query and executes the query against knowledge base 110.

The template repository 112 (see FIG. 1) contains a collection of templates (abstract statements) that relate one or more concept, instance, or relationship from the knowledge model. The templates can be used to assist users in the construction of specific queries that may be executed against the knowledge base. The notion of a template as "abstract statement" refers to an assertion composed of entities that can be modified ("instantiated") by the user. In general, the templates will be composed of abstract concepts (as opposed to concrete instances) and a valid relationship that links the concepts, but it is also possible to implement the system using different types of templates, e.g., that relate one instance and one concept.

The set of possible templates for a given knowledge model, therefore, will normally be a subset of the global set of potential statements available in the knowledge model. In the specific implementation, where the knowledge model is constructed using triple-based statements, the templates may be in the form of concept-relationship-concept (C,r,C) triples like ("basketball player", "plays for", "team").

When creating a search, users are presented with one or more templates. The user can then replace one or more of the concepts in the template with specific instances (thereby "instantiating" the template) to create a statement, thereby making the template more precise. These statements can then be added to a query, which can then be executed against the knowledge base. In the specific case of semantic triple-based templates, the user may modify either the subject or the object in the template to create a statement that may be added to a query. Again, variations of this approach may be implemented are possible; for example, the system may alternatively allow the user to change the relationship in the template, but not the entities, etc.

In general, the construction of the templates can be dependent on the particular implementation of the underlying knowledge model. As such, the concept-relationship-concept (C,r,C) template discussed above is thus just a possible template in the case of triple-based statements, but other template configurations could be implemented for different types of knowledge models. Additionally, the templates may also feature other kinds of elements, e.g., operators to be applied in combination with the abstract statement itself. Some embodiments may also consider different approaches towards the templates in the template repository upon the modification of the knowledge base, e.g., if concepts are deleted or modified in the knowledge model. One possibility is that templates are deleted or modified accordingly, but it may also be the case that templates are left untouched independently of the modifications in the knowledge base.

Depending upon the system implementation, different processes for creating a suitable list of candidate templates may be utilized. In one implementation, a set of templates can be created or selected manually. In that case, individuals familiar with the knowledge model and the types of searches that are likely to be executed against the target knowledge base may decide which candidate templates would be of special relevance in the context of the given knowledge model. Those templates may then be made available for use in querying the knowledge base. Alternatively, the generation of candidate templates may take place through automatic algorithms, for example by detecting those combinations of entities within the knowledge model that are particularly relevant in relation to the knowledge base through the knowledge base's annotations. Finally, embodiments may also consider the combination of manual and automatic techniques for the detection and creation of suitable candidate templates.

Figure 2:
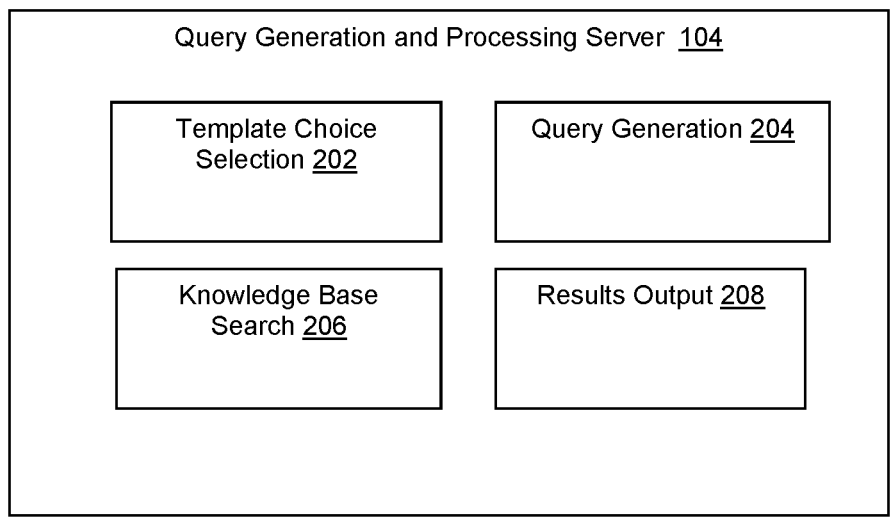
FIG. 2 is a block diagram showing functional components of a query generation and processing system.

FIG. 2 is a block diagram showing the functional components of query generation and processing server 104. Query generation and processing server 104 includes a number of modules configured to provide one or more functions associated with the present information retrieval system. Each module may be executed by the same device (e.g., computer or computer server), or may be distributed across a number of devices.

Template choice reception module 202 is configured to select a number of candidate templates from template repository 112 and allow a user to select one or more of the candidate templates (e.g., using client 102). Template choice reception module 202 may also enable the user to instantiate one or more of the selected templates to create statements by entering specific information into one or more fields within the selected template.

Query generation module 204 is configured to generate a structured query using the templates selected and modified by the user (e.g., using client 102) and any additional query terms or phrases that may be provided by the user.

Once a query is created, knowledge base search module 206 is configured to take the query generated by query generation module 204 and execute the query against the desired knowledge base.

Results output module 208 is configured to retrieve the items (or links thereto) that are relevant to an executed query (performed by knowledge base search module 206) executed against the knowledge base and provide an appropriate output to the user via client 102. In addition to the items themselves, results output module 208 may be configured to generate statistics or metrics associated with the resulting items and depict that data to the user. Results output module 208 may, for example, also depict a graph showing the relevant knowledge model entities that are present in the search results. Results output module 208 may also display one or more available templates (including, possibly, the templates as-modified by the user) thereby enabling the user to add templates, or modify the selected templates in order to further refine a search query.

Figure 3:
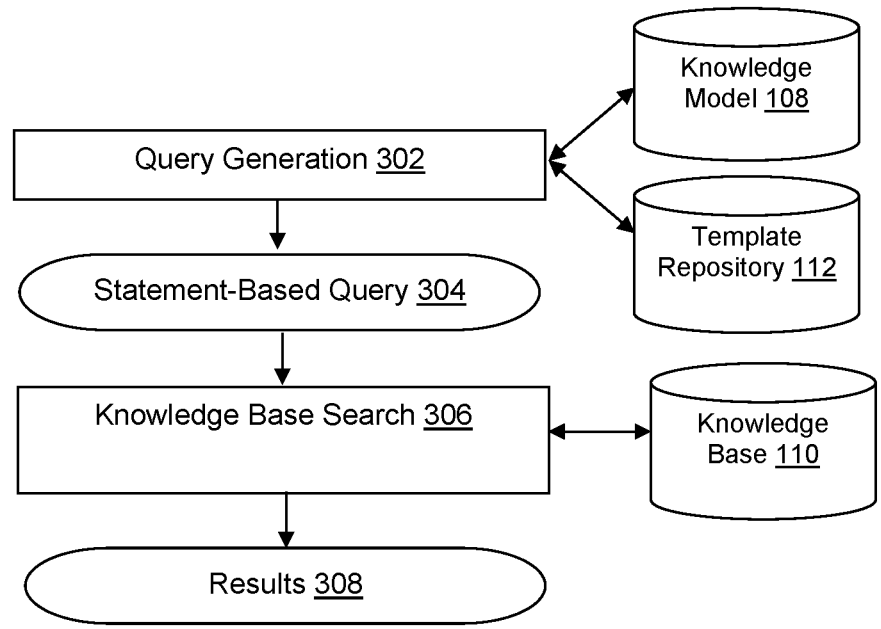
FIG. 3 is a flowchart illustrating an exemplary method for performing a query in accordance with the present disclosure.

FIG. 3 is a flowchart illustrating a method for building a structured query using templates. Generally, the method includes two steps, first query generation, and then a knowledge base search. During query generation (see step 302), the user selects one or more templates for a particular knowledge model 108 from template repository 112. The user can then enter specific data into one or more of the templates (for example, by replacing the concepts in a particular template with specific instances) to instantiate the template and thereby create a statement. One or more statements can then be combined into a query. In some implementations, the user can provide additional search terms, keywords, or natural language that can be incorporated into the query along with the statements. In step 304, the information provided by the user (including instantiated templates and additional search terms) is combined to form a query. In step 306, the query generated in step 304 is executed against knowledge base 110. After performing the query, a set of results is generated in step 308 that may be displayed for the user.

The outcome of the process illustrated in FIG. 3 is a set of results that includes a list of items having metadata that matches the structured query specified by the user. For simplicity, FIG. 3 illustrates the approach in a single iteration. However, the process may be repeated any number of times, alternating between the generation of queries and their use to search over the knowledge base. This approach enables searching in an iterative manner, making it possible to refine the search results through the addition of new statements to the query, or by modifying or deleting the existing ones.

Figure 4:
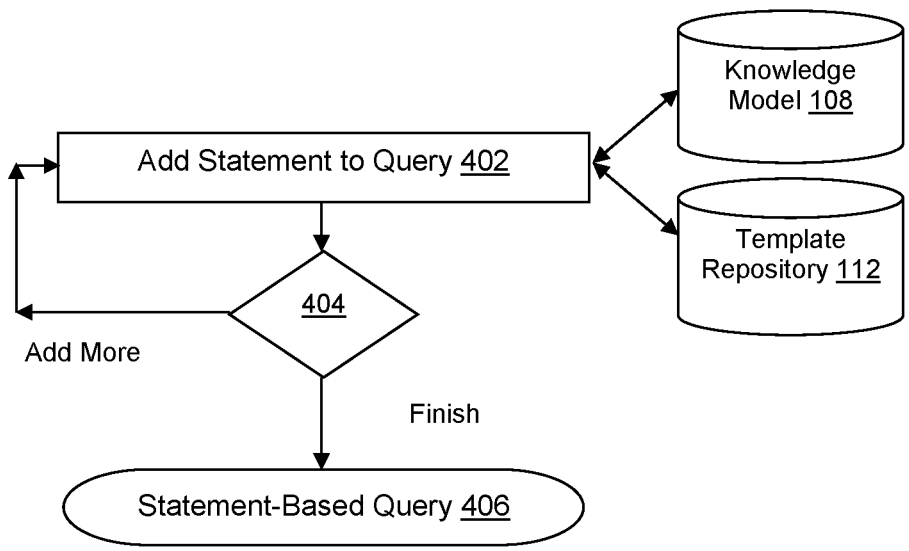
FIG. 4 is a flowchart illustrating details of the method illustrated in FIG. 3.

In some cases, the user may add multiple instantiated templates (also referred to as statements) to a query. FIG. 4, for example, is a flowchart illustrating a query generation process in which a user may add multiple statements to a query. The method depicted in FIG. 4, for example, may be a sub-process performed as part of step 302 of FIG. 3. Referring to FIG. 4, in step 402 the user selects a template from a number of candidate templates (e.g., provided by template choice selection module 202 of query generation and processing server 104). The user can then revise the selected template, for example by modifying the template to replace concepts with specific instances, thereby creating a statement. Once created, the statement may be added to the query (e.g., by query generation module 204). In step 404 the user decides whether to add an additional template or statement to the query. If so, the method returns to step 402 and the user can select an additional template in order to create another statement. If not, in step 406 the completed statement or revised templates can be added to a query for executing against a knowledge base.

The user may add any number of statements (or completed templates) to a query, by making use of the templates from template repository 112 and then contextualizing the templates by instantiating parts of the templates with elements from the knowledge model to create statements.

Figure 5:
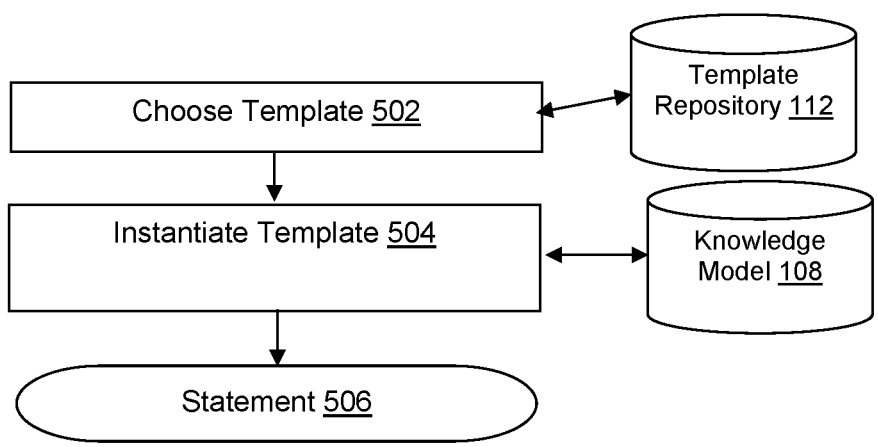
FIG. 5 is a flowchart for a method for a user to select and instantiate a template.

FIG. 5 is a flowchart illustrating a method for the addition of a new statement to a query. In step 502, the user selects a template from template repository 112. When selecting from existing templates, the user may be presented with a list of existing templates in the template repository 112, from which one or more templates may be selected. Alternatively, the user can navigate through existing templates by searching for the templates in a tree structure, or through a query box, etc.

Besides choosing a template from the repository, it might be the case that the system allows for the creation of new templates. When creating a new template, the user may combine concepts from the knowledge model 108 through valid relationships in order to construct a template. After a new template is constructed, the user may choose to store the new template in template repository 112 so that the new template becomes available for future searches and may be available for other users. In the specific case of triple-based statements, the user may combine two different concepts through a valid relationship in order to create a new (C,r,C) template.

Figure 8A:
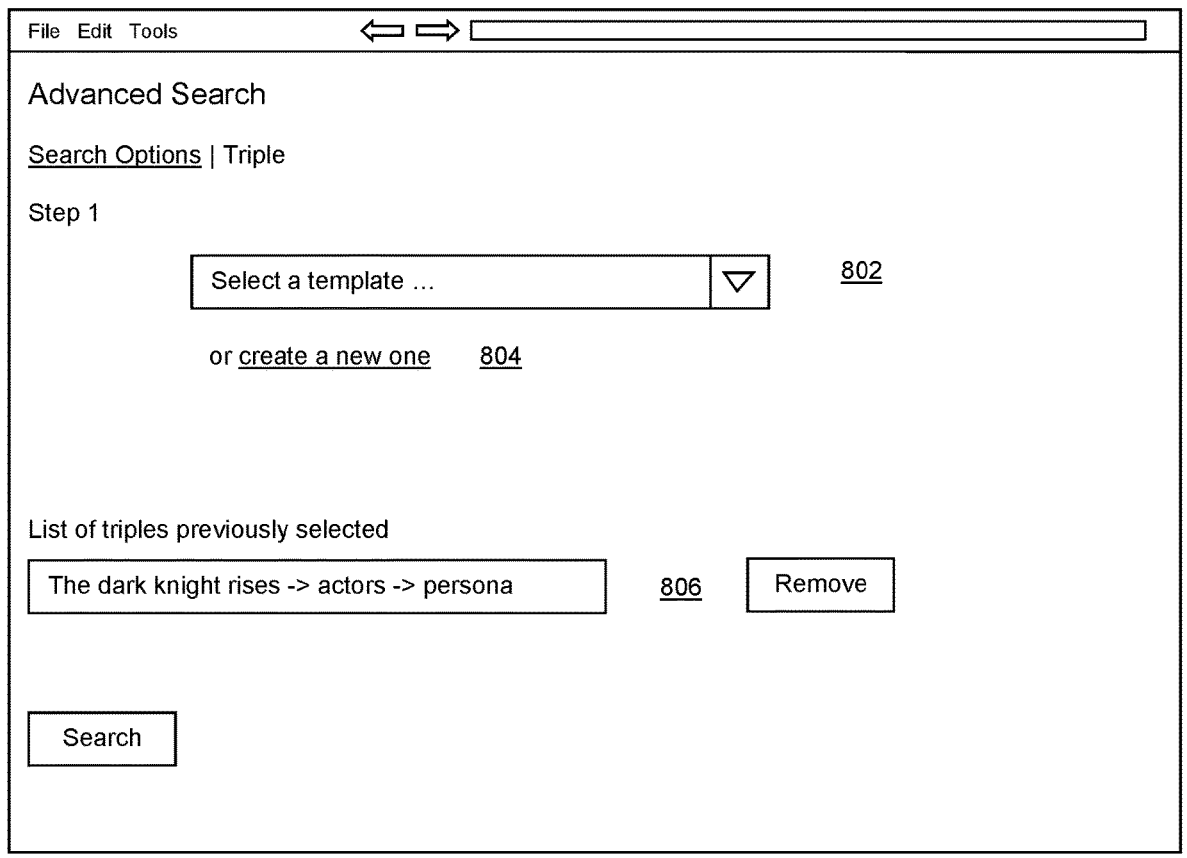

FIGS. 8A-8B are screenshots illustrating a user interface enabling a user to select a template in accordance with the present disclosure. In FIG. 8A user interface 800 is presented allowing a user to initiate a search. The user interface may be presented to a user, for example, after the user has initiated a search activity for a particular subject matter using search client 102 (see FIG. 1). This may involve accessing query generation and processing server 104 via communication network 106. In one implementation, query generation and processing server 104 hosts a web server configured to generate and transmit to client 102 the user interfaces depicted in FIGS. 8A-8D, in which cases the user interfaces may be depicted or implemented as web pages, though any other technologies for generating user interfaces for client 102 may be utilized. The user interfaces may be hosted on a remote device, such as query generation and processing server 104 or may be local to client 102.

User interface 800 includes a pull down menu 802 that, when activated by the user provides a list of candidate templates for the current knowledge model. The user may also click upon link 804 to initiate the process for creating a new template that may be utilized in a particular search. Finally, interface 800 includes a region displaying a list of previously-used templates that may be selected by the user.

In this example, the user activates pull down menu 802 to generate a list of candidate triples that may be selected. FIG. 8B illustrates user interface 800 after the user has selected pull down menu 802 to generate a listing of candidate templates associated with the current knowledge model. In this example associated with FIG. 8B the knowledge model is associated with the domain of film, theatre, and television. As such, candidate triples 810 displayed include "Assets with movie that belongs to genre" or "Assets with movie directed by director." When the user identifies a triple that is useful for the user's desired search, the user can select the triple by clicking upon the desired triple statement. In this example, the user clicks upon the triple statement "Assets including movie with actor."

Regardless of the way through which the template is selected, the template's type may be different depending on the underlying knowledge model. As described above, if the knowledge model is semantic and based on triples, one option is that the selected template is of the (C,r,C) type.

The author of a predefined semantic query template (e.g., a system administrator or a user re-executing a previous semantic query) may identify restrictions or constraints on each of the parameters within the triple(s) that make up the predefined semantic query template.

For example, a predefined semantic query template may include the triple <movie> <that-belong> <genre>. The author of this predefined semantic query template may restrict the parameter <movie> to US movies only, so that the <movie> parameter is restricted by the triple <movie> <production-location> <US>. The contextualization received by the author may therefore restrict the movies that can be chosen for a specific genre, and will be returned as a knowledge base 110 result, to movies produced in the US.

Predefined semantic query parameter restrictions may be distinguished from multiple triples joined by a Boolean value, in that the parameter constraints are part of the semantic query itself. Specifically, the parameter constraint restricts a specific parameter within a single triple, whereas Boolean values join two separate triples. Put another way, a parameter constraint restricts the possible values of the parameter used in contextualization, whereas a Boolean constraint restricts the values in the result set.

Figure 19:

FIGS. 18-19 are screenshots illustrating a UI enabling a user to initiate and perform a semantic query with restrictions or constraints in accordance with the present disclosure. Server 104 may generate a UI according to the method steps disclosed above. In addition to the parameter UI controls, the UI may include, as seen in FIGS. 18-19, menus, text boxes, and/or combo boxes for each of the parameters, defining a restriction or constraint on that parameter.

Server 104 may transmit the UI to client 102 for display. In addition to replacing parameters as disclosed above, the user may select or otherwise input a parameter constraint on one or more of the concepts, instances, and/or relationships within one or more triples displayed on the client (e.g., the [movie] concept parameter is restricted to movies # longerThan 1 Hour# in FIGS. 18-19). In response to the input or selection of each input parameter constraint, server 104 and/or client 102 may generate a data record storing the constraint, associated in one or more of the disclosed databases 108, 110, 112, in association with the appropriate parameter. The user may then execute the query according to the parameter constraint, (e.g., <[movie] # longerThan 1 Hour#> <contains> <FlyingCar/[vehicle]> in FIGS. 18-19), and submit the query.

Server(s) 104 may execute a database query of the knowledge base 110 as disclosed above. However, the database query of the knowledge base 110 will only include those movies that are longer than one hour, and contain flying cars and/or other vehicles, according to the parameter constraints, as seen in FIGS. 18-19.

Users may store predefined semantic query templates in association with a unique identifier created by the user. The user may input this unique identifier, such as a human readable template name (though any identifier mechanism may be used), store the associated predefined semantic query template in the template repository 112, and later input the unique identifier into a template UI as a type of shorthand allowing the user to re-execute the associated predefined semantic query.

When recalling the predefined semantic query template via the unique identifier, the user may also contextualize the predefined and stored query, by either modifying the parameters of the original query, adding additional triples and/or parameters, and/or contextualizing/instantiating the additional triples/parameters. This principle also applies to root query templates, described below, but may be limited by referred-to templates that have already been executed. The modified query, based on the semantic query template referenced by the unique identifier, may therefore inherit all of the parameters referenced in the predefined semantic query template referenced by the unique identifier.

This semantic query template inheritance may therefore be viewed as a composition of existing semantic query templates. These existing semantic query templates may also be combined into additional templates, creating a "root" semantic query template, which is assigned its own unique identifier, and which references the unique identifiers of two or more predefined semantic queries. Thus, the root semantic query templates may include a recursive structure of semantic query templates referring to other semantic query templates to any depth.

For example, a first semantic query template may be assigned the unique identifier GenreMovie, referring to the semantic query template <genre><of> <movie>. A second semantic query template may be assigned the unique identifier ShortMovie, referring to the semantic query template <movie><shorter-than><30 Minutes>. The root template combining these two semantic query templates may be GenreShortMovies: GenreMovie and ShortMovie, which searches for all genres of all movies that are shorter than 30 minutes.

Because the root semantic query template references referred-to semantic query templates, the semantics of a root semantic query template may change if one or more referred-to semantic query templates change. For example, if the parameters of ShortMovie above changes to <movie> <shorter-than> <15 Minutes>, then the root semantic query template GenreShortMovies implicitly changes, too. From the point of that change forward the genres of movies shorter than 15 minutes, rather than shorter than 30 minutes are queried. To avoid this, the author of GenreShortMovies may create a copy and refer to those copies by value, rather than referring to existing copies by name.

Additional values may be added to the root semantic query templates as well, to further contextualize the template. For example GenreShortMovies: GenreMovie and ShortMovie may be contextualized to include the parameter GenreShortMovies: GenreMovie(Minions) and ShortMovie. In this case GenreMovie is contextualized by referring to a movie by the name of "Minions." This value is taken as the parameter value for "<movie>" in the "GenreMovie" semantic query template. The results of the root semantic query template includes the movie "Minions," assuming that it fits the required parameters for a short movie.

Figure 20:
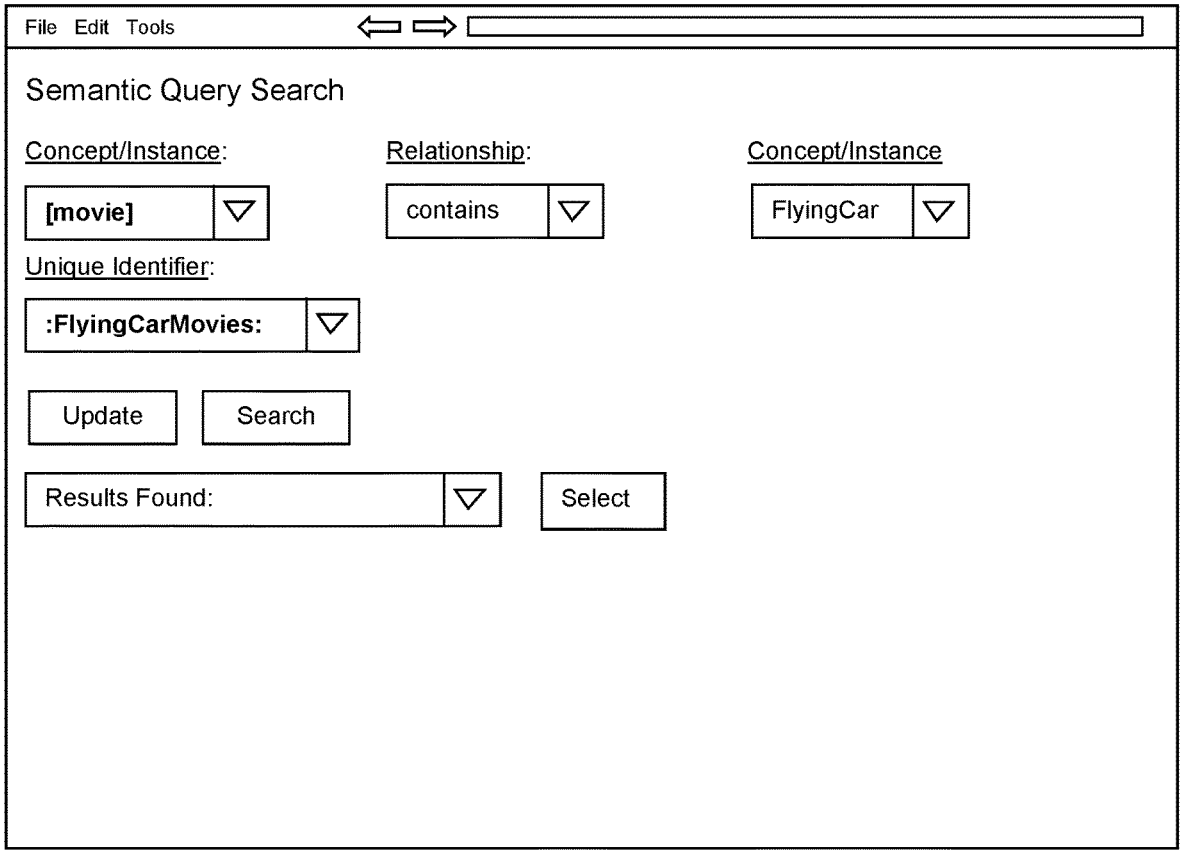

FIGS. 20-21 are screenshots illustrating a UI enabling a user to define a predefined semantic query template according to a unique identifier (e.g., :FlyingCarMovies:), expand the parameters received through inheritance by referencing the unique identifier (e.g., adding Boolean AND as well as the <[movie]> <createdIn> <[country]> triple), and initiate and perform a semantic query according to the parameters inherited by the referenced unique identifier, and any additional parameters, in accordance with the present disclosure. Server 104 may generate a UI according to the method steps disclosed above. In addition to the parameter UI controls, the UI may include, as seen in FIGS. 20-21, menus, text boxes, and/or combo boxes for identifying the unique identifier, stored and executed in association with each of the parameters in the predefined query.

Server 104 may transmit the UI to client 102 for display. In addition to replacing parameters as disclosed above, the user may select or otherwise input a unique identifier associated in one or more of the databases with the one or more of the concepts, instances, and/or relationships within one or more triples displayed on the client (e.g., :FlyingCarMovies: includes the triple <[movie]> <contains> <FlyingCar> in FIG. 20, and inherits <[movie]> <contains> <FlyingCar>, but is further combined with the triple <[movie]> <createdIn> <[country]> in FIG. 21). In response to the input or selection of each unique identifier, or any additional triples or parameters added in addition to those inherited by the referenced unique identifier, server 104 and/or client 102 may generate a data record storing the triples and/or parameters associated with the unique identifier in one or more of the disclosed databases 108, 110, 112. The user may then execute the query according to the inherited triples and/or parameters, as well as any additional triples/parameters combined with the inheritance (e.g., <[movie]> <contains> <FlyingCar> AND <[movie]> <createdIn> <[country]> in FIGS. 20-21), and submit the query.

Server(s) 104 may execute a database query of the knowledge base 110 as disclosed above. However, the database query of the knowledge base 110 will include all those triples and/or parameters associated with the unique identifier, as well as those triples/parameters later added to the inherited triples/parameters associated with the unique identifier, which, would include movies that contain flying cars and are created in all countries, according to the inherited and additional parameters, as seen in FIGS. 20-21.

Server(s) 104 may be configured to identify concepts, instances, and/or relationships in the knowledge model that are similar to the concepts, instances, and/or relationships within the parameters of semantic query templates input by a user. Server(s) 104 may identify these similar semantic query templates according to templates that (a) have some or all of the same triples as the input template, or (b) have some or all of the same concepts, instances or relationships as the input template.

Using these identified similarities, server(s) 104 may generate, and transmit to the client for display, a list of semantic query templates similar to that input by the user, as alternatives to the input semantic query template. Server(s) 104 may order the alternative semantic query templates according to the results from (a) above, descending by the number of matching triples and from (b) above, descending by the number of matching concepts, instances and relationships. The results from (a) come before (b) as similarity based on triples is more relevant than similarity based on concepts, instances and relationships only.

Server 104 may also be configured to store, in association with each semantic query template data records stored, a first date data field recording the date of entry of the template, and one or more additional data entry fields recording each time the user accesses the predefined semantic query or template. Using these data fields, the semantic query system may therefore keep a record/history of executed semantic queries. In some embodiments, these data records may also include details about the relationship of the executed query to the corresponding semantic query templates. The user may then reference one or more similar semantic query templates based on the history of corresponding semantic query templates. The user may search according to criteria for searching similar semantic query templates in a semantic query template catalog, discussed in more detail below. In some embodiments, the history may be ordered according to the most frequently used semantic query templates, with more recently used or frequent semantic query templates being ranked higher than less recently or frequently used ones.

Over time many predefined semantic query templates may be created and available for users. These predefined semantic query templates may be stored in a semantic query template catalog (template catalog). User's may browse this template catalog in order to search for a specific template. However, as the template catalog continues to grow (e.g., possibly reaching hundreds or even thousands of templates) it becomes impractical for the user to browse and/or search the catalog without a clearly structured user interface. Thus, to improve the user's search ability, the template catalog may include an index of semantic query templates. This index may include an index of the concepts, instances or relationships used in the semantic query templates, thereby improving the efficiency associated with searching and querying the catalog.

Users may add semantic query templates to the template catalog, or may add or modify successfully used semantic queries, and store the successful query or modification as a predefined semantic query template. Another alternative is for the user to construct a template from its concepts, instances and/or relationships without relying on existing queries or templates and contextualizing the constructed query to match the user's desired template parameters.

The server(s) 104 may also generate predefined semantic queries automatically by accessing the knowledge model and deriving the predefined semantic queries from the knowledge model. For example, for every concept the system can follow all possible relationships to the concept referred to by the relationships. This will result in all possible triples starting from a concept. The generated triples will all be valid semantic queries when the referenced concept is parameterized. Thus, the template catalog may be made up of the automatic generation of generated and available semantic query templates.

In some embodiments, server(s) 104 may dynamically generate templates according to the selection of templates by the user from the template catalog. This approach would not require storage space for generated semantic query templates, since the templates would be generated according to those templates, selected, but not browsed, by the user. In some embodiments, server(s) 104 may identify the most-searched concepts and generate predefined semantic queries based on user's search behavior.

In order to avoid unconstrained additions of semantic query templates a review process can be enforced that ensures that proposals for semantic query templates are examined first and only added after no issues have been found (like for example duplicates or inconsistent use of concepts, relationships or instances). This involves submitting proposals for predefined semantic query templates by users and their examination by reviewers. Approved semantic query template may then be added by an administrator, or the original submitter can be given the access right to add the proposed predefined semantic query.

A user may search the predefined semantic queries according to the user's intended context. The user may start from a predefined semantic query designed to find other predefined semantic queries in the semantic query template catalog. This initial predefined query may include the triple "<predefined-query> <contains-concept> <concept>". This includes all predefined queries that refer to a specific concept and the semantic search system will provide the possible values for the parameter <concept>.

The disclosed system is able to search semantic query templates using an implicit ontology in the knowledge base that represents the concepts of semantic query templates. The presence of this ontology allows semantic query templates to be used to search for other semantic query templates.

More directed searches are possible using Boolean operators. For example: "predefined-query contains-concept <concept> and predefined-query contains-relationship <relationship>". With proper contextualization this supports the search for predefined queries. For example, "predefined-query contains-concept movie" would return all predefined semantic queries that refer to the concept "movie".

The screenshots illustrated in FIGS. 20-21 include a UI enabling a user to search the template catalog using one or more predefined semantic query templates according to a unique identifier (e.g., :FlyingCarMovies:). This UI also expands the parameters received through inheritance by referencing the unique identifier (e.g., adding Boolean AND as well as the <[movie]> <createdIn> <[country]> triple). The user may further initiate and perform a semantic query according to the parameters inherited by the referenced unique identifier, and any additional parameters, in accordance with the present disclosure. Server 104 may generate a UI according to the method steps disclosed above. In addition to the parameter UI controls, the UI may include, as seen in FIGS. 20-21, menus, text boxes, and/or combo boxes for identifying the unique identifier, stored and executed in association with each of the parameters in the predefined query.

Server 104 may transmit the UI to client 102 for display. In addition to replacing parameters as disclosed above, the user may also select or otherwise input a unique identifier associated in one or more of the databases with the one or more of the concepts, instances, and/or relationships within one or more triples displayed on the client (e.g., :FlyingCarMovies: includes the triple <[movie]> <contains> <FlyingCar> in FIG. 20, and inherits <[movie]> <contains> <FlyingCar>, but is further combined with the triple <[movie]> <createdIn> <[country]> in FIG. 21). In response to the input or selection of each unique identifier, or any additional triples or parameters added in addition to those inherited by the referenced unique identifier, server 104 and/or client 102 may generate one or more data records storing the triples and/or parameters associated with the unique identifier in one or more of the disclosed databases 108, 110, 112. The user may then execute the query according to the inherited triples and/or parameters, as well as any additional triples/parameters combined with the inheritance (e.g., <[movie]> <contains> <FlyingCar> AND <[movie]> <createdIn> <[country]> in FIGS. 20-21), and submit the query.

Server(s) 104 may execute a database query of the knowledge base 110 as disclosed above. However, the database query of the knowledge base 110 will include all those triples and/or parameters associated with the unique identifier, as well as those triples/parameters later added to the inherited triples/parameters associated with the unique identifier, which, would include movies that contain flying cars and are created in all countries, according to the inherited and additional parameters, as seen in FIGS. 20-21.

Semantic query templates may be changed by users over time. For example, users may provide changes in the knowledge model or refine query details. In the context of complex semantic query templates, the user may want to understand the changes over time in order to see the evolution of the query template. Every change of a semantic query template may create a new version of the semantic query template. This ensures that previous versions do not get overwritten and lost.

In some embodiments, a user browsing the semantic query catalog may see all versions of every semantic query template. The user may select a specific semantic query template version and use that for contextualization. Alternatively, a user may desire to always use the latest version of a specific semantic query template. In this case, rather than referring to a specific version of a semantic query template, the user interface may display a configuration option which only indicates the latest versions.

A semantic query template may be used as a parameter value, and the same principles described above apply: when a specific version of a semantic query template is used, that will be incorporated. When no specific version of a semantic query template is used, then the latest version is always used as the default parameter. This may cause inconsistencies, such as a new version of a semantic query template being created that has an additional parameter itself, which then becomes a parameter value. This may cause various inconsistencies, as an additional parameter has to be contextualized.

Since the relationships between semantic query templates (e.g., one using another one as parameter value) is known, a change in a relationship may be used to identify one or more potential inconsistencies between semantic query templates and/or relationships within them. A user or administrator may resolve any potential conflicts or inconsistencies in order to ensure that changes within semantic query templates are consistent.

After a semantic query template is contextualized, it may be utilized as a semantic query. In order to contextualize the semantic query templates, parameters may be replaced by concepts, relationship, instances or other semantic queries. As semantic queries continue to evolve, it may be more and more difficult to determine the origin of the semantic queries. In other words, the user may be unable to identify the original semantic query template used to create the semantic query. In order to record the use of semantic query templates it is necessary to know which semantic query was derived from which of the semantic query templates (it can be more than one due to the ability to combine several through Boolean operators). Therefore, the system will maintain a reference (possibly visible to the end user) between the semantic query as a result of contextualization and all possible semantic query templates that were used for the contextualization. When the semantic query is executed (once or more than once) the query processor may record the transaction within a query history, and may simultaneously correlate semantic query template use. The user may therefore perform an analysis of most recent evaluations based on this historic data frequency and most recent evaluations.

Thus, the process of generating and using pre-defined semantic queries may be summarized as follows: First, the user searches the predefined semantic query templates for queries that contain concepts that the user is interested in (e.g., in the template catalog). For this, the user reuses the special query template that supports searching for predefined semantic query templates. The system fetches all concepts, instances and relationships that a user can use to contextualize the query template for queries. Once contextualized, the user initiates the search for query templates and the system transmits the contextualized query and returns the matching query templates to the user. The result might be empty if no query template exists for the chosen contextualization.

Alternatively the user might have a list of predefined semantic queries stored in a local workspace and the user selects one of those instead of querying for a predefined semantic query template. Browsing the template catalog by a user is an option also using an appropriate user interface.

Second, a suitable semantic query template is chosen by the user and contextualized as necessary. This includes replacing parameters and possibly changing or extending the semantic query. In order for the user to be able to choose concepts, instances and relationships, the system fetches those from the knowledge model based on the selected semantic query template.

Extending the semantic query can be done by adding further criteria and connecting them with Boolean operators. The additional criteria can be semantic queries themselves, or even predefined semantic query templates (which requires the user to be able to search for query templates while concurrently contextualizing). Adding parameter constraints or contextualizing a parameter through a semantic query itself is also part of this step in the process of querying.

Third, the user might request the semantic query system to propose alternative semantic query templates based on the template that the user has selected. The user has the option to use a semantic query template similarity search or history-based semantic query template similarity search, or both. The semantic query system will search for similar semantic query templates and present any similar semantic query templates to the user. The user may then opt to keep the semantic query template that the user originally selected or select a similar one from the similarity search result list.

Fourth, the user may execute the contextualized semantic query and the disclosed system then processes its results. In order to do so, the system transmits the contextualized semantic query to the query processor. If a predefined semantic query template is not fully contextualized it cannot be executed as a query. Instead, the semantic query system may automatically contextualize it by replacing the parameters with all possible applicable concepts, relationships or instances, and executing the semantic query for each combination. The system may present the results separately for each combination, which may result in many semantic query results, one for each parameter replacement combination. Alternatively, the semantic query system might determine that it is best to not execute the query, but instead return the set of possible concepts, relationships or instances that may replace any parameter which is not yet contextualized. This may indicate to the user that further contextualization choices are necessary.

Fifth, the user may manage the semantic query after execution. One possibility is to discard it. In addition, if the user modified the semantic query, the user may parameterize it and store it in the semantic query system as a new predefined semantic query template. In a more advanced semantic query systems the user may have a workspace assigned to him and he could also chose to store the query within his workspace for future reference.

Returning to FIG. 5, once the template is chosen (or created), the user instantiates the template in order to define more accurately the restriction that will be applied to the search through the instantiated template. To instantiate the template (in step 504), the user inserts arbitrarily selected terms into the different sections of the template. For example, in the case of semantic triple-based systems where templates are in the form of (C,r,C), the concepts presented as subject (s) and object (o) in the (s,p,o) triple can be substituted by specific instances that belong to the respective concepts. Embodiments may consider providing guidance to the user by proposing candidate instances that belong to the given concept through different means.

Figure 8C:
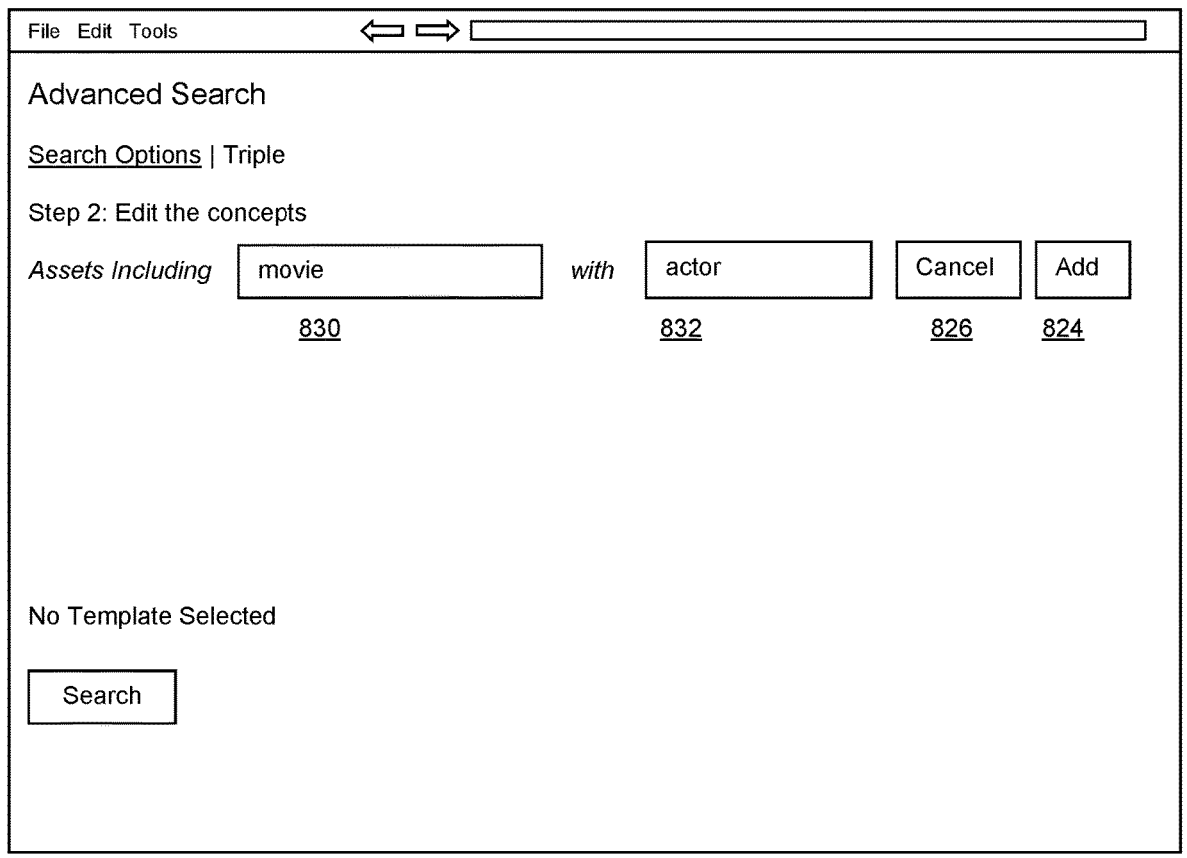
Figure 9:
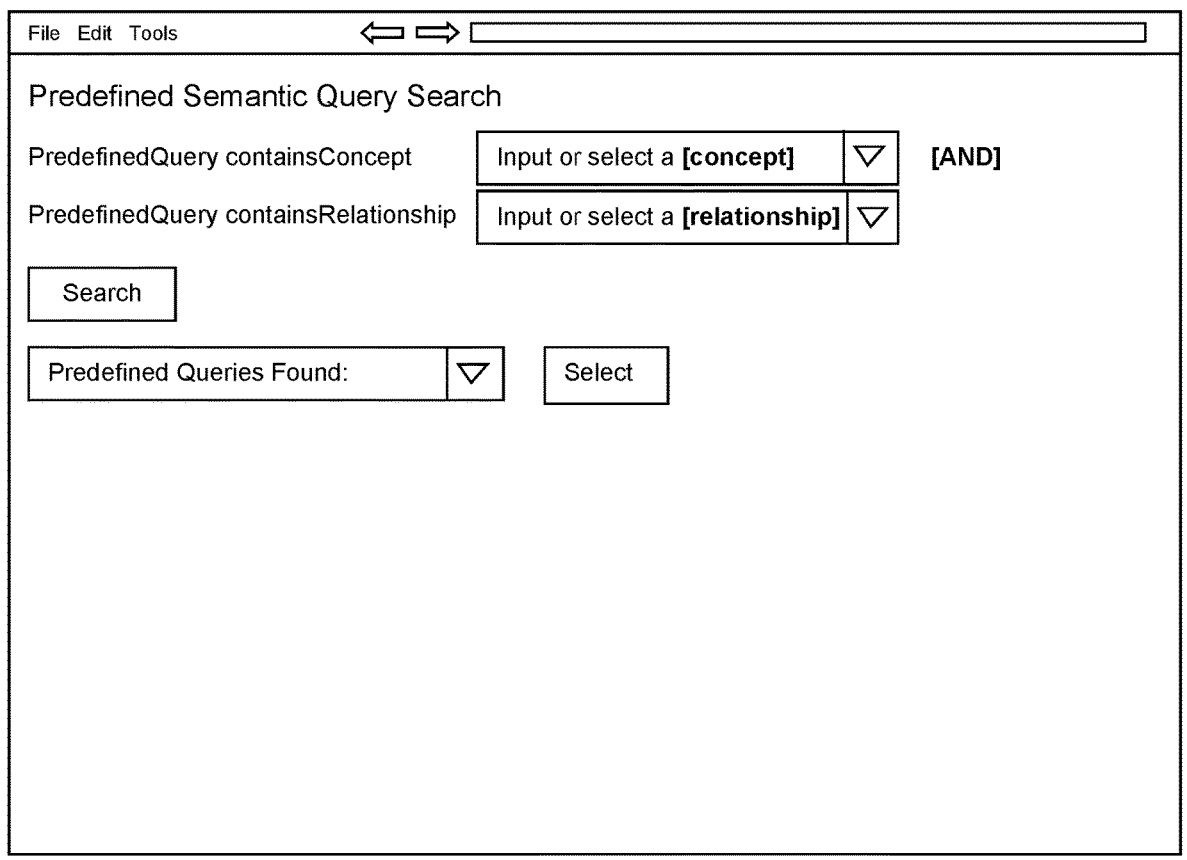
Figure 11:
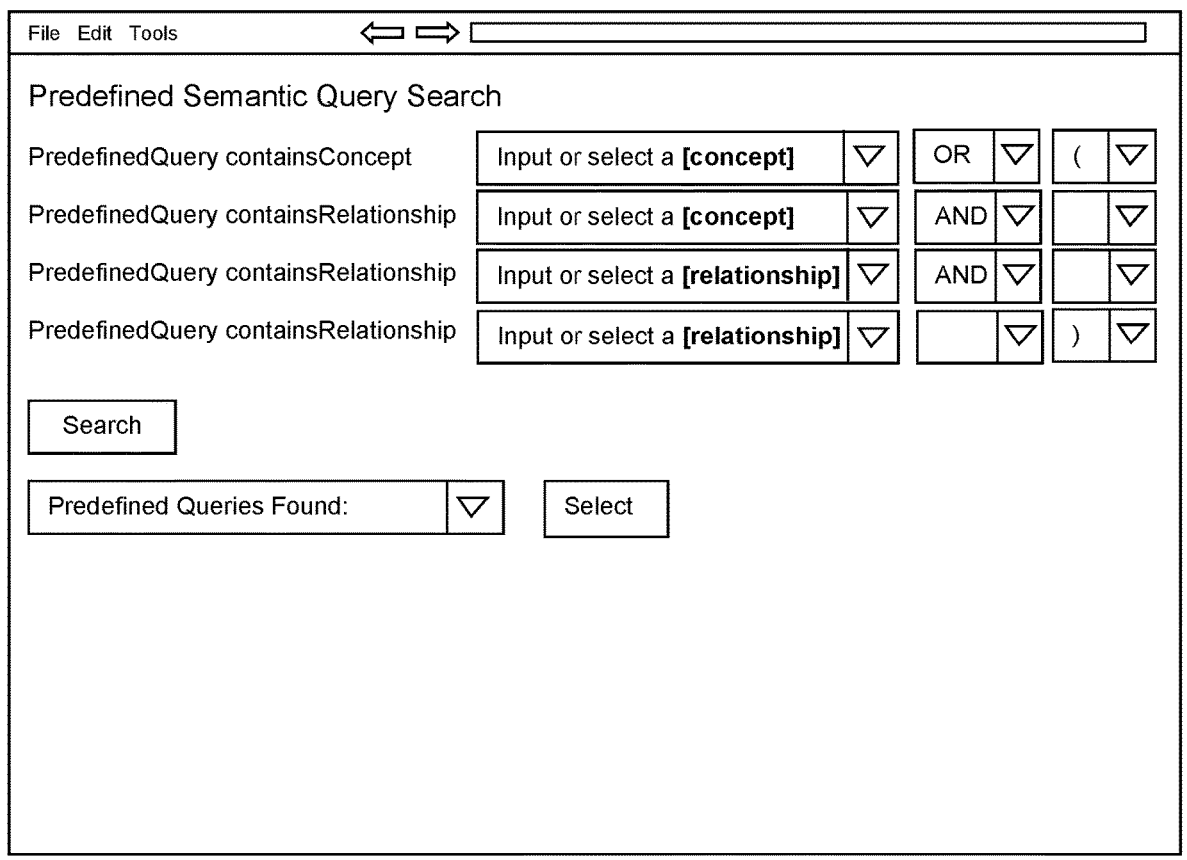
Figure 12:
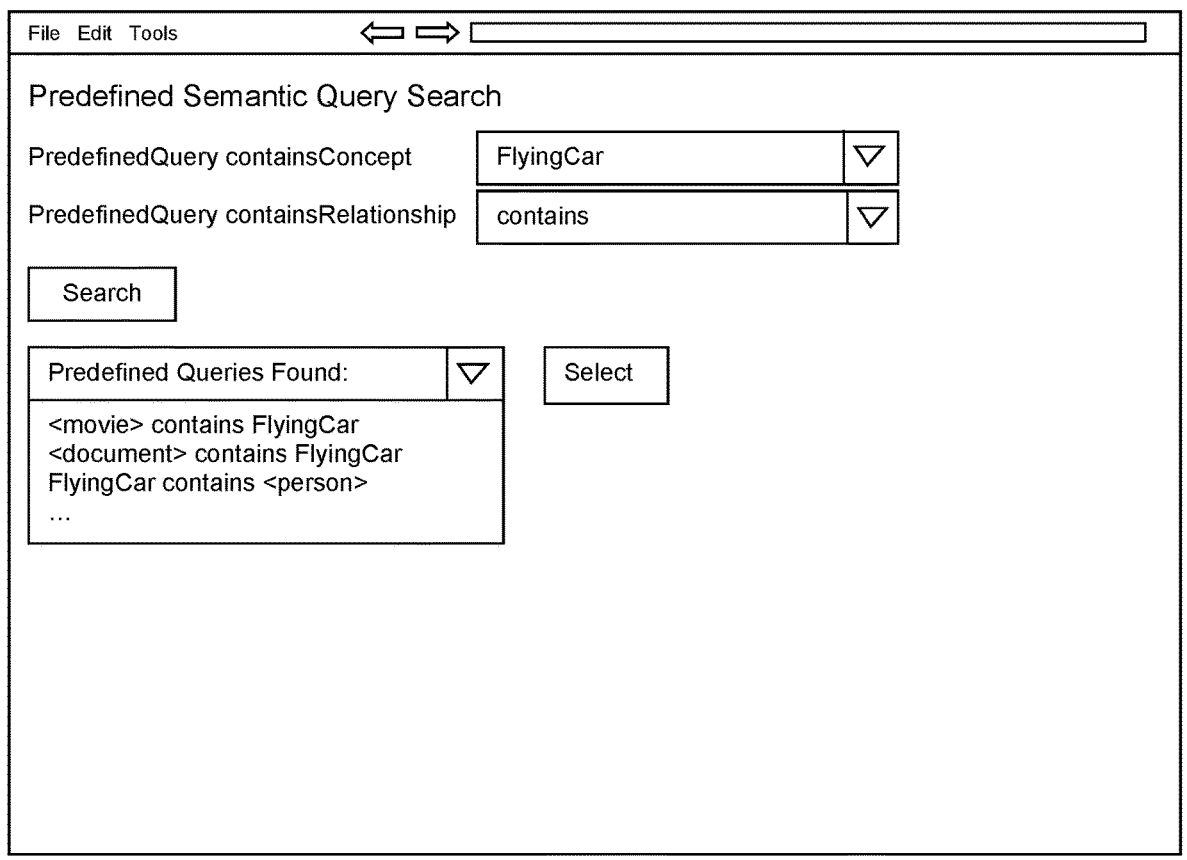

FIG. 8C depicts user interface 800 after the user has selected the desired triple. As such, the triple "Assets including movie with actor" is displayed in user interface

800. In this example, the triple includes two concepts: movie and actor. Within user interface 800 the user can click on either the word movie 820 or actor 822, which are current generic concepts. After clicking on either movie 820 or actor 822 the user is provided with an opportunity to replace the generic concept of either movie or actor with a specific instance of the concept.

The user interface 800 of FIG. 8C also presents the user with an option to add 824 additional templates that can be combined with the "assets including movie with actor" template to further refine the search. Alternatively, the user can cancel 826 a particular template and remove the template from the search query.

Accordingly, in FIG. 8D, the user has clicked upon the movie 820 concept and entered the specific instance 830 of "the dark night rises". Similarly, the user has clicked upon the actor 822 instance and entered the specific instance 832 of "christian bale". When entering the specific instances into the template the user may be provided with an opportunity to enter free form text. In some implementations, as the user types potential auto-completions for the letters being typed may be displayed for selection by the user. In that case, the auto-completions may be selected from the relevant knowledge model. Alternatively, the user may select specific instances by navigating directly through a representation of the relevant knowledge model.

Figure 6:
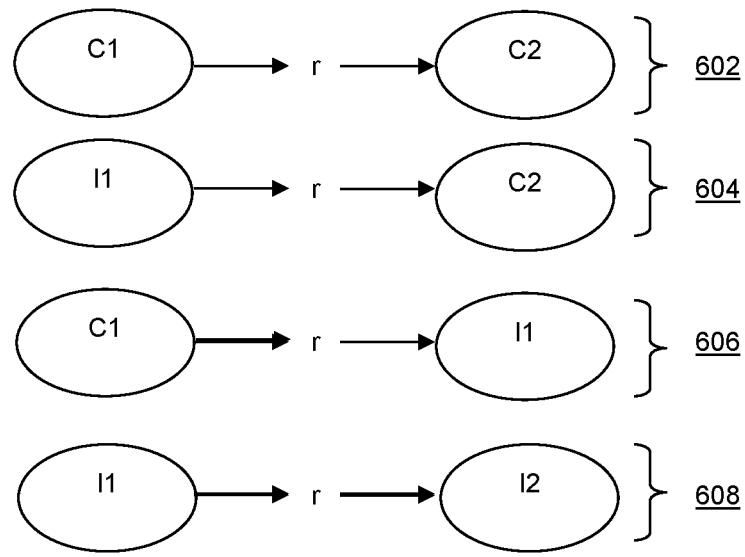
FIG. 6 is an illustration depicting the four possible query statement combinations.

In one specific implementation of the system, a semantic knowledge model in which the templates are triple-based statements is utilized. In that configuration, as discussed above, templates may be composed by two concepts and a valid relationship between those two concepts (C,r,C) selected from the knowledge model. If, in instantiating the template, the user substitutes concepts for instances, there would exist four different configurations of search query statement that may be generated based upon the template. FIG. 6 is an illustration depicting the four possible query statement combinations.

Item 602 depicts a concept-relationship-concept (C,r,C) statement. In that case, none of the concepts has been instantiated (i.e., replaced with instances), so the statement that would be added to the query is identical to the corresponding template. For example, if the abstract template ("basketball player", "plays for", "team") is selected and left unchanged for the creation of statement 602, it would appear in identical form in the query. Such open statements would match all assets with any basketball player playing for any team if executed as part of a query.

Item 604 depicts an instance-relationship-concept (I,r,C) statement. In statement 604 the subject, but not the object, of the triple statement has been instantiated (i.e., replaced with a specific instance). Statement 604 is therefore more precise than statement 602. An example of such a statement would be ("Pau Gasol", "plays for", "team"), meaning that the statement, if added to an executed query, would restrict the query results to assets from the knowledge base that match the condition of a particular basketball player ("Pau Gasol") playing for any team.

Item 606 depicts a concept-relationship-instance (C,r,I) statement. Statement 606 is the opposite case to statement 604 because in statement 606 the object, but not the subject, has been instantiated (i.e., replaced with a specific instance). It is thus also more precise in terms of search restrictions than statement 602. An example of this type of statement would be ("basketball player", "plays for", "Los Angeles Lakers"), meaning that the statement, if added to an executed query, would restrict the results to those associated with any basketball player playing for a particular team ("Los Angeles Lakers").

Item 608 depicts an instance-relationship-instance (I,r,I) statement. In statement 608 both the subject and object concepts from the template are instantiated (i.e., replaced with specific instances), expressing a more precise statement than statements 602, 604, or 606. An example of such a statement would be ("Pau Gasol", "plays for", "Los Angeles Lakers"), meaning that the statement, if added to an executed query, would restrict the results to those annotated with a particular player ("Pau Gasol") playing for a particular team ("Los Angeles Lakers").

Figure 7:
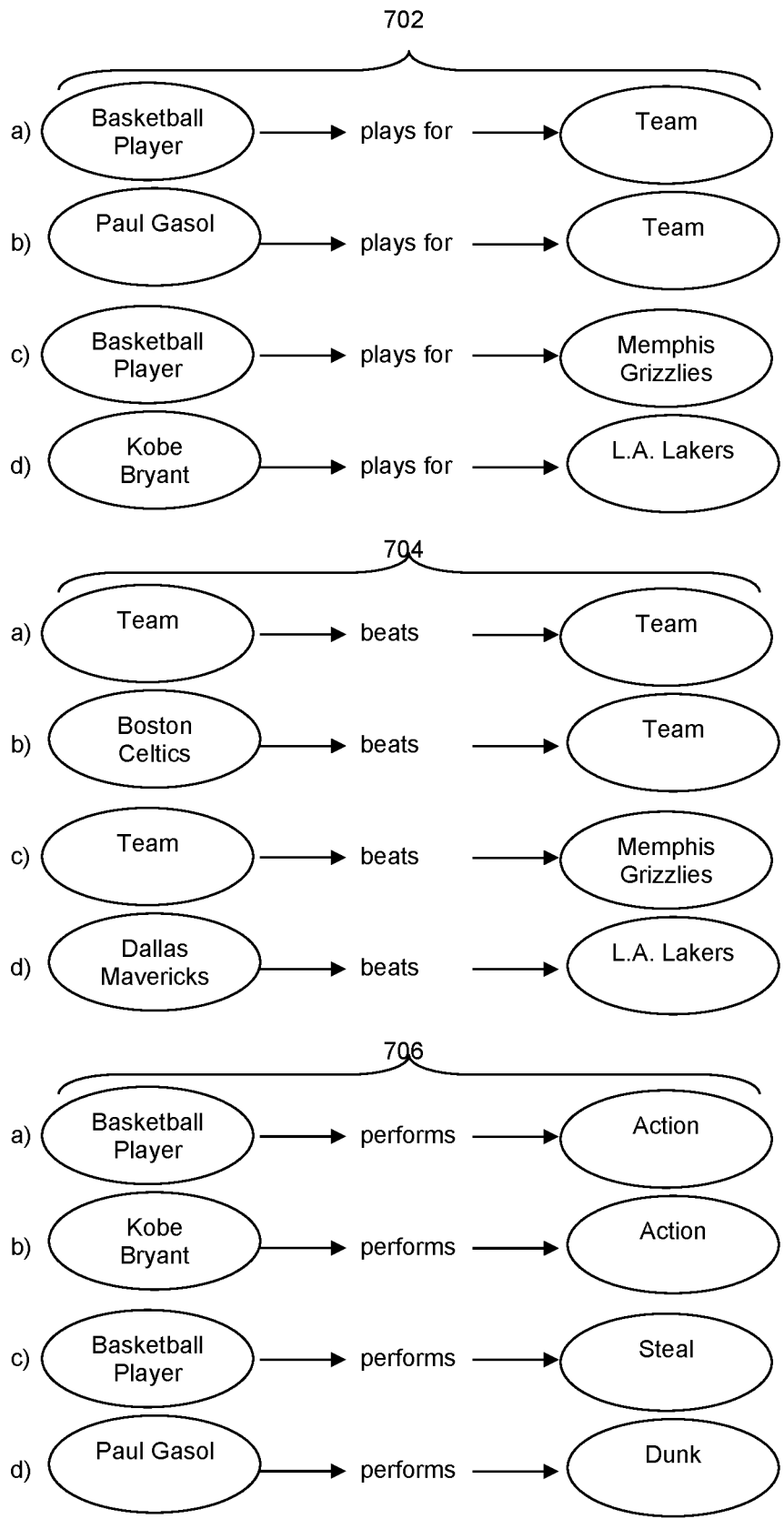
FIG. 7 is an illustration depicting example templates and potential instantiation for each of the example templates.

FIG. 7 is an illustration depicting example templates and potential instantiation for each of the example templates. FIG. 7 is made up of three columns of statements (columns 702, 704, and 706) arranged in three rows (row a), row b) and row c)). Each column represents different ways a particular template may be instantiated in the present system.

The template for column 702 consists of the triple ("basketball player", "plays for", "team"). This template might be instantiated as: a) the (C,r,C) statement which is identical to the template; b) an (I,r,C) statement like ("Pau Gasol", "plays for", "team"); c) a (C,r,I) statement like ("basketball player", "plays for", "Memphis Grizzlies"); or d) an (I,r,I) statement like ("Kobe Bryant", "plays for", "Los Angeles Lakers").

The template for column 704 consists of the triple ("team", "beats", "team"). This template can be instantiated as: a) the (C,r,C) statement that is identical to the template; b) an (I,r,C) statement like ("Boston Celtics", "beats", "team"); c) a (C,r,I) statement like ("team", "beats", "Memphis Grizzlies"); or d) an (I,r,I) statement like ("Dallas Mavericks", "beats", "Los Angeles Lakers").

The template for column 706 consists of the triple ("basketball player", "performs", "action"). This template can be instantiated as: a) the (C,r,C) statement which is identical to the template; b) an (I,r,C) statement like ("Kobe Bryant", "performs", "action"); c) a (C,r,I) statement like ("basketball player", "performs", "Steal"); or d) an (I,r,I) statement like ("Pau Gasol", "performs", "Dunk").

Independently of the type of template used and the way statements have been instantiated, the generated statements can be combined into a structured query, which can be used to perform a search. Therefore, the query can be thought of as a combination of these statements that may be formally represented as {S1∪S2 . . . ∪Sn}.

It should be noted that this manner of representing the combination of statements is just one possible mechanism for representing a query as other formal representations may be used, as well as different ways to combine the statements rather than a union. In the case of a semantic system as described in the present examples, each statement Si may be a triple in the form (s,p,o), where the subject ("s") and the object ("o") in the statements may appear either as an instance or as a concept.

With reference to FIG. 7, an example query can be constructed using statement b) of column 704 and statement d) of column 706, namely the (I,r,C) statement ("Boston Celtics", "beats", "team") and the (I,r,I) statement ("Pau Gasol", "performs", "Dunk"). A query combining those two statements would generate a result listing including items with annotations in which a particular team ("Boston Celtics") wins a match against any other team, and in which a particular player ("Pau Gasol") appears performing a particular action ("Dunk"). Formally, the query may be expressed as {S1∪S2} or {("Boston Celtics", "beats", "team")∪("Pau Gasol", "performs", "Dunk")}.

The semantic query based on the set of statements, arbitrarily represented as ({S1∪S2 . . . ∪Sn}), can be executed against a knowledge base in order to retrieve items that fulfill the conditions defined in the query. In performing the search, the annotations of the items in the knowledge base are analyzed to determine whether they satisfy the terms of the query. If so, that those items are returned in the result set.

The result of the search is an identification of items from the knowledge base that are relevant to the statements in the query. One possible way of representing the result set is as {A1 (Sa, Sb, . . . Sz), A2 (Sa', Sb', . . . Sz'), . . . An (Sa'', Sb'', . . . Sz'')}, where Ai is an asset that satisfies the assertions in the query, and (Sa, Sb, . . . Sz) is the complete set of statements that are related to the given asset. Again, it should be noted that the actual implementation choice regarding the retrieval of assets, as well as the formal representation of the results, might be implemented in a number of different ways. For instance, it could be case that in a given implementation, assets in the resulting set are only required to fulfill one or some of the statements in the query (e.g., multiple statements may be cord together). Similarly, statements in the annotations and in the query may be slightly different, yet still be considered as a match, etc. Additionally, embodiments may order the set of results according to various criteria. For example, the items in the result set for which the assertions in the query have more weight (because those are the only statements associated with the item, or because the same assertion is associated more than once with the same item, e.g., for being associated from different parts along the length of a video) show up earlier in the results.

When matching statements in the query to those used for annotation of items in the knowledge base, matches may be identified even when the statements in the query are not identical to the annotations in the knowledge base. For example, in the case of triple-based statements, the statements can be of four general types depending on the instantiation of subject and object, namely (C,r,C), (C,r,I), (I,r,C) and (I,r,I), as illustrated in FIG. 6. For this reason, the statements in the query may be expanded and/or generalized in order to obtain all the possible matches including all the different types of statement. In performing that expansion, concepts in the query statements are expanded into all possible instance values, and instances in the query statements are generalized into the concept to which they belong. In such an implementation, a statement of the type (I,r,I) in the query such as (I1,r,I2), where instance I1 belongs to concept C1 and instance I2 belongs to concept C2, could be expanded to also match assets annotated with the statements (I1,r,C2), (C1,r,I2) or (C1,r,C2).

The following is an example of this query expansion. With reference to the query specified above {S1∪S2}={("Boston Celtics", "beats", "team")∪("Pau Gasol", "performs", "Dunk")}, the search process could return, for example, a set of three assets such as {A1 (Sa1, Sb, Sc, Sd), A2 (Sa1, Sb, Se, Sf, Sg), A3 (Sa2, Sb, Sh, Si)}. In this example, in the resulting set S2 would be Sb (i.e., all returned assets that contain an annotation for "Pau Gasol" performing a dunk") and S1 would match both Sa1 ("Boston Celtics", "beats", "Los Angeles Lakers") and Sa2 ("Boston Celtics", "beats", "Memphis Grizzlies"). Sc-Si are the other statements used to annotate those three assets. For example, assuming that Sc=("Pau Gasol", "plays for", "Los Angeles Lakers") and Sd=("Kobe Bryant", "plays for", "Los Angeles Lakers"), asset A1 features a "Dunk" by "Pau Gasol" (Sb) in which him and "Kobe Bryant" are playing with "Los Angeles Lakers" (Sc, Sd) in a match lost against "Boston Celtics" (Sa1). Once again, while this particular example illustrates a very particular scenario, it should be noted that different results could have been retrieved depending on the actual implementation details of the search functionality.

In the present system, after the user has generated a number of instantiated templates or statements, the statements are combined together and executed against the knowledge base. The statements (and any other natural language terms provided by the user) may be joined in a formal query through the use of well-known query languages for semantic graph models, such as SPARQL, or other RDF query languages. Such query languages allow for the creation of queries through the use of triple patterns including both constants and variables, and are therefore suitable for the combination of statements in standard formats that cater for logical conjunctions in accordance with the present disclosure.

As a non-limiting example, the steps described above (and all methods described herein) may be performed by any central processing unit (CPU) or processor in a computer or computing system, such as a microprocessor running on a server computer, and executing instructions stored (perhaps as applications, scripts, apps, and/or other software) in computer-readable media accessible to the CPU or processor, such as a hard disk drive on a server computer, which may be communicatively coupled to a network (including the Internet). Such software may include server-side software, client side software, browser-implemented software (e.g., a browser plugin), and other software configurations.

Although the present invention has been described with respect to preferred embodiment(s), any person skilled in the art will recognize that changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

What is claimed is:

1. A system, comprising a server, comprising a hardware computing device coupled to a network and including at least one processor executing instructions within a memory which, when executed, cause the system to:
   generate a graphical user interface (GUI), transmitted through the network and displayed on a client coupled to the network, the GUI comprising:
   a first GUI control receiving a selection of concept from a plurality of concepts identified within a knowledge model; and
   a second GUI control receiving a selection of a relationship from a plurality of relationships within the knowledge model;
   receive, from the client through the network, a first user input selecting the concept and the relationship;
   execute a first database command selecting, from a query template database coupled to the network, at least one query template including the concept and the relationship;
   transmit, through the network, a first instruction in the instructions updating the GUI to display a third GUI control automatically populated with the at least one query template;
   receive, from the client through the network, a second user input selecting a query template from the at least one query template;

execute a second database command selecting, from the query template database, at least one parameter of the query template selected;

transmit, through the network, a second instruction in the instructions updating the GUI to display at least one GUI control, automatically populated with the at least one parameter of the query template;

receive, from the client, a modification to the at the least one parameter of the query template;

store the query template and the modification in the query template database;

identify, within a knowledge base comprising a data or file repository, a metadata or a content including a combination of the concept, the relationship, or an instance of the concept, and associated in the knowledge base with at least one data or at least one file;

generate a fourth GUI control comprising a list including a name of the at least one data or the at least one file;

transmit the fourth GUI control through the network for display within the GUI on the client.

2. The system of claim 1, wherein the knowledge model comprises a subject matter domain comprising a plurality of concepts, instances, and relationships defining a knowledge model ontology organized as a plurality of triple statements.

3. The system of claim 2, wherein the knowledge model includes a hierarchy of super groups or sub groups among and between the plurality of concepts, instances, and relationships, and wherein the highest concept is all possible concepts, the highest instance is all possible instances, and the highest relationship is all possible relationships.

4. The system of claim 1, wherein the modification includes replacing a specific combination of characters, indicating that the at least one parameter may be replaced, with the at least one concept, the at least one instance, or the at least one relationship.

5. The system of claim 1, wherein the modification includes:
  receiving a user input comprising the modification and a unique identifier comprising a template name; and
  storing the query template and the modification as a predefined semantic query in association with the unique identifier in a semantic search query catalog.

6. The system of claim 5, wherein the unique identifier identifies a semantic query including inheritance from at least one additional template.

7. The system of claim 1, wherein the modification includes at least one constraint input by a system administrator restricting an input or selection of the parameter received by a subsequent user.

8. The system of claim 1, wherein the modification includes a selection of an operator
  concatenating a first triple statement to second triple statement; or
  grouping the first triple statement with the second triple statement.

9. The system of claim 1, wherein the parameter comprises embedding a semantic query within the query template, the semantic query including the relationship between the at least one concept and the at least one instance.

10. The system of claim 1, wherein the instructions further cause the system to store the modification as a new query template, wherein subsequent users are able to modify the at least one parameter.

11. A method, comprising:
  generating, by a server, comprising a hardware computing device coupled to a network and including at least one processor executing instructions within a memory, a graphical user interface (GUI), transmitted through the network and displayed on a client coupled to the network, the GUI comprising:
    a first GUI control receiving a selection concept from a plurality of concepts identified within a knowledge model; and
    a second GUI control receiving a selection of a relationship from a plurality of relationships within the knowledge model;
  receiving, by the server from the client through the network, a first user input selecting the concept and the relationship,
  executing, by the server, a first database command selecting, from a query template database coupled to the network, at least one query template including the concept and the relationship;
  transmitting, through the network, a first instruction in the instructions updating the GUI to display a third GUI control automatically populated with the at least one query template;
  receiving, by the server from the client through the network, a second user input selecting a query template from the at least one query template;
  executing, by the serer, a second database command selecting, from the query template database, at least one parameter of the query template selected;
  transmitting, by the server through the network, a second instruction in the instructions updating the GUI to display at least one GUI control, automatically populated with the at least one parameter of the query template;
  receiving, by the server, from the client, a modification to the at least one parameter of the query template;
  storing, by the server, the query template and the modification in the query template database;
  identifying, by the server, within a knowledge base comprising a data or file repository, a metadata or a content including a combination of the concept, the relationship, or an instance of the concept, and associated in the knowledge base with at least one data or at least one file;
  generating, by the server, a fourth GUI control comprising a list including a name of the at least one data or the at least one file;
  transmitting, by the server, the fourth GUI control through the network for display within the GUI on the client.

12. The method of claim 11, wherein the knowledge model comprises a subject matter domain comprising a plurality of concepts, instances, and relationships defining a knowledge model ontology organized as a plurality of triple statements.

13. The method of claim 12, wherein the knowledge model includes a hierarchy of super groups or sub groups among and between the plurality of concepts, instances, and relationships, and wherein the highest concept is all possible concepts, the highest instance is all possible instances, and the highest relationship is all possible relationships.

14. The method of claim 11, wherein the modification includes replacing a specific combination of characters, indicating that the at least one parameter may be replaced, with the at least one concept, the at least one instance, or the at least one relationship.

15. The method of claim 11, wherein the modification includes:
  receiving a user input comprising the modification and a unique identifier comprising a template name; and storing the query template and the modification as a predefined semantic query in association with the unique identifier in a semantic search query catalog.

16. The method of claim 15, wherein the unique identifier identifies a semantic query including inheritance from at least one additional template.

17. The method of claim 11, wherein the modification includes at least one constraint input by a system administrator restricting an input or selection of the parameter received by a subsequent user.

18. The method of claim 11, wherein the modification includes a selection of an operator
   concatenating a first triple statement to second triple statement; or
   grouping the first triple statement with the second triple statement.

19. The method of claim 11, wherein the parameter comprises embedding a semantic query within the query template, the semantic query including the relationship between the at least one concept and the at least one instance.

20. The method of claim 11, further comprising the step of storing, by the server, the modification as a new query template, wherein subsequent users are able to modify the at least one parameter.

* * * * *